US012734110B2

(12) United States Patent
Tull et al.

(10) Patent No.: US 12,734,110 B2
(45) Date of Patent: Sep. 15, 2026

(54) DEVICES AND METHODS FOR CRUSHING PILLS

(71) Applicant: EnOPrep LLC, Atlanta, GA (US)

(72) Inventors: Austin Blake Tull, Smyrna, GA (US); Blake Daniel Shay, Tampa, FL (US); Ward Pafford Broom, Altanta, GA (US); Brian VanHiel, Smyrna, GA (US)

(73) Assignee: EnOPrep, Inc., Atlanta, GA (US)

( * ) Notice: Subject to any disclaimer, the term of this patent is extended or adjusted under 35 U.S.C. 154(b) by 659 days.

(21) Appl. No.: 18/311,700

(22) Filed: May 3, 2023

(65) Prior Publication Data

US 2023/0381065 A1 Nov. 30, 2023

Related U.S. Application Data

(60) Provisional application No. 63/364,100, filed on May 3, 2022.

(51) Int. Cl.

| | |
|---|---|
| ***A61J 7/00*** | (2006.01) |
| ***A61J 1/20*** | (2006.01) |
| ***A61M 5/30*** | (2006.01) |
| ***A61M 5/315*** | (2006.01) |
| ***B02C 19/00*** | (2006.01) |
| ***B02C 19/08*** | (2006.01) |

(52) U.S. Cl.
CPC .................................. *A61J 7/0007* (2013.01)

(58) Field of Classification Search
CPC ...... A61J 7/0007; A61J 7/2037; A61J 7/2072; A61J 7/2096; A61J 7/0053; B02C 19/0056; B02C 19/08; A61M 5/3015; A61M 5/31596
See application file for complete search history.

(56) References Cited

U.S. PATENT DOCUMENTS

| | | | | | |
|---|---|---|---|---|---|
| 4,366,930 | A * | 1/1983 | Trombetti, Jr. | ....... | A61J 7/0007 241/199.12 |
| 5,472,421 | A * | 12/1995 | Klearman | ........... | A61M 5/3129 604/82 |
| 6,063,062 | A * | 5/2000 | Paradis | ................. | A61M 39/26 604/249 |
| 2019/0038331 | A1 | 2/2019 | Purdy | | |
| 2019/0091104 | A1 | 3/2019 | Yang | | |
| 2020/0376254 | A1 | 12/2020 | Isaacson | | |
| 2021/0113811 | A1 * | 4/2021 | Nakagami | ......... | A61M 25/0097 |
| 2021/0378915 | A1 | 12/2021 | Yang | | |

FOREIGN PATENT DOCUMENTS

WO 2020240554 A1 12/2020

OTHER PUBLICATIONS

International Search Report for PCT/US23/66560, Sep. 12, 2023.

* cited by examiner

*Primary Examiner* — Mohammed S. Alawadi
(74) *Attorney, Agent, or Firm* — Novel IP

(57) ABSTRACT

A pill crusher device for crushing one or more pills is described. The device includes a male grinder component and a female grinder component that, together, form an enclosed chamber. The male grinder component is rotatable relative to the female grinder component, thereby enabling sets of serrated edges to move relative to each other and crush the one or more pills into a powder. A spring, valve, and adapter system enables the selective injection of liquid, the filtered passing of air, and the ability to repeatedly inject and suction out a liquid/powder mixture.

20 Claims, 30 Drawing Sheets

9 TOOTH
CLOCKWISE

9 TOOTH
COUNTER-CLOCKWISE

24 TOOTH
COUNTER-CLOCKWISE

TOOTH ANGLE INVERTED AT CENTER 50% OF PATTERN

MULTIPLE TOOTH COUNT PATTERN

12 TOOTH SYMMETRIC

270

| | |
|---|---|
| Spring Type | Compression |
| System of Measurement | Metric |
| Length | 14 mm |
| OD | 5.5 mm |
| OD Tolerance | -0.3 to 0.3 mm |
| ID | 4.5 mm |
| Wire Diameter | 0.5 mm |
| Compressed Length @ Maximum Load | 5.4 mm |
| Maximum Load | 1.6 lbs. |
| Spring Rate | 0.18 lbs./mm |
| Spring Rate Tolerance | -0.01 to 0.01 lbs./mm |
| Material | 302 Stainless Steel |
| End Type | Closed |

FIG. 2O

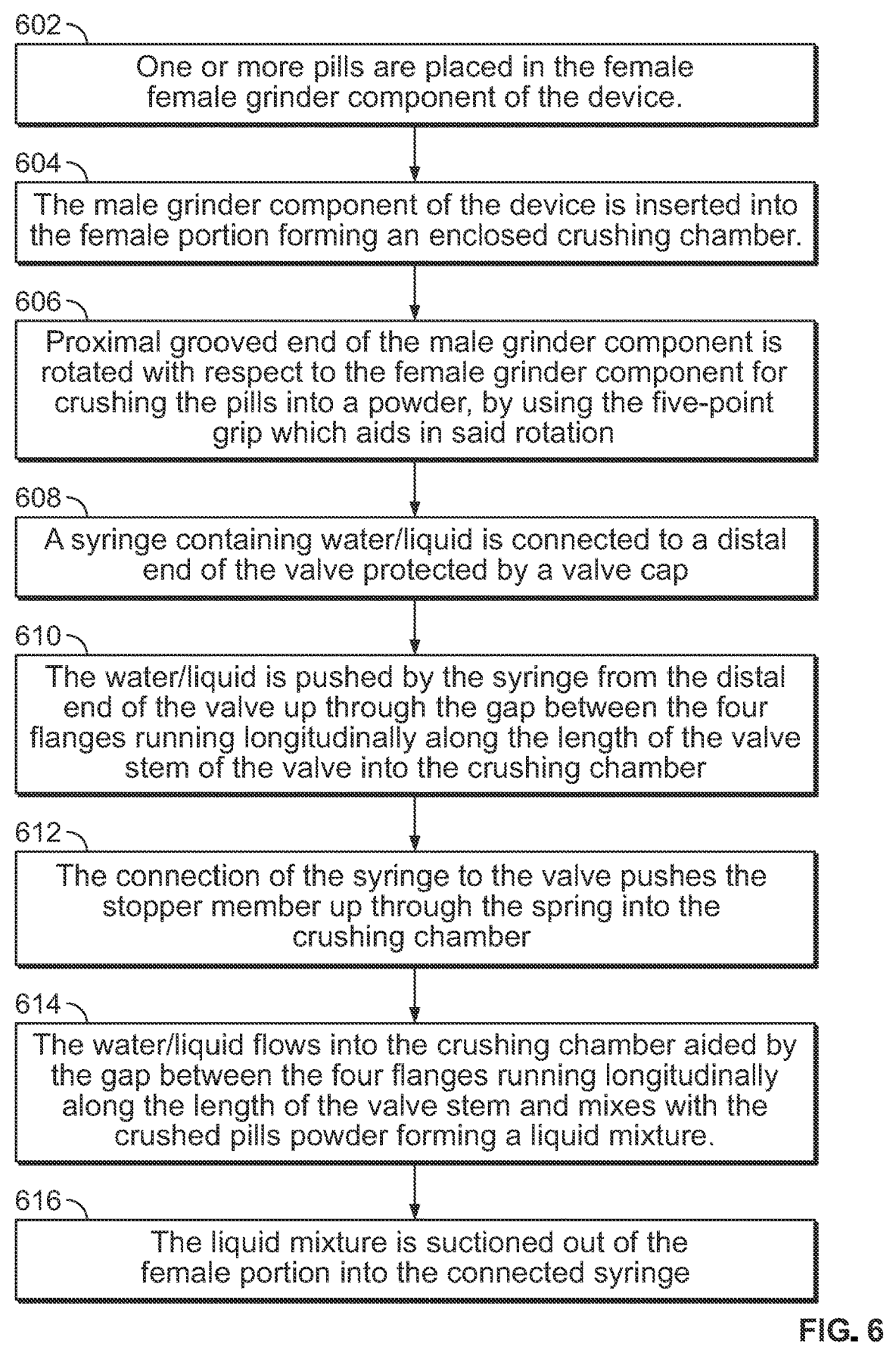

602 One or more pills are placed in the female female grinder component of the device.

↓

604 The male grinder component of the device is inserted into the female portion forming an enclosed crushing chamber.

↓

606 Proximal grooved end of the male grinder component is rotated with respect to the female grinder component for crushing the pills into a powder, by using the five-point grip which aids in said rotation

↓

608 A syringe containing water/liquid is connected to a distal end of the valve protected by a valve cap

↓

610 The water/liquid is pushed by the syringe from the distal end of the valve up through the gap between the four flanges running longitudinally along the length of the valve stem of the valve into the crushing chamber

↓

612 The connection of the syringe to the valve pushes the stopper member up through the spring into the crushing chamber

↓

614 The water/liquid flows into the crushing chamber aided by the gap between the four flanges running longitudinally along the length of the valve stem and mixes with the crushed pills powder forming a liquid mixture.

↓

616 The liquid mixture is suctioned out of the female portion into the connected syringe

FIG. 6

MIN VOLUME

ASSEMBLED

UNASSEMBLED

SECTION A-A

DEVICES AND METHODS FOR CRUSHING PILLS

CROSS-REFERENCE

The present application relies upon U.S. Patent Provisional Application No. 63/364,100, titled "Devices and Methods for Crushing Pills" and filed on May 3, 2022, for priority. The above-mentioned application is herein incorporated by reference in its entirety.

FIELD

The present specification relates to devices and systems for crushing solid medication (pills) to a powder and mixing the powder with a liquid/water. In particular, the present specification relates to a sealed, closed-loop medication crushing and dispensing system for solid pills which need to be mixed with a liquid to create a suspension before being administered to a patient.

BACKGROUND

In some cases, patients in various health care facilities require enteral or oral medication administration with a liquid medication that is obtained by grinding and mixing with a liquid of solid medications, such as pills. Currently, healthcare professionals grind pills in an open receptacle, mix the ground powder with liquid in an open container to create a suspension, insert a syringe into the open container to suction the liquid suspension medication into the syringe, and then use that syringe to administer the medication to the patient.

Unfortunately, grinding pills in an open environment may cause the pill dust to spread and be inhaled by a patient, caregiver, healthcare professional, or other clinician that may be grinding the pills. This may be hazardous to the health of the clinician. The continued inhalation of pill dust from a variety of pills may even lead to serious diseases, allergic reactions, or other adverse health conditions. In some cases, the ground pill powder or dust spreading into the atmosphere may even be genotoxic, carcinogenic, or teratogenic and impair fertility. Hence, clinicians engaged in crushing pills are often required to wear protective gear such as personal protective equipment (PPE) and/or face shields, which may be cumbersome to wear and may cause inefficiencies and delay in the administration of drugs to patients. Commonly available pill crusher devices are not completely sealed off from the environment, and their use may pose a significant health risk to users. Furthermore, commonly available pill crushers typically have multiple compartments that often result in unnecessary wastage or points of failure.

WIPO Patent Publication No. WO2020240554A1 (hereinafter, the "'554 publication") discloses a closed system pill crusher device. The '554 publication describes an "[a] pparatus comprising a closed-system grinding syringe for liquefying and delivering a solid dosage form, the closed-system grinding syringe comprising: a barrel, which is shaped so as to define (a) a lateral wall shaped so as to define a cylindrical inner surface, (b) a top barrel opening, and (c) a bottom barrel wall; a fluid port disposed on the bottom barrel wall; a plunger, which comprises (a) a plunger shaft; (b) a plunger head shaped so as to define a bottom plunger wall shaped so as to define a lower surface; and (c) a plunger-head annular seal, wherein the plunger head is insertable into and moveable within the barrel such that (a) a portion of the barrel defines a closed-system syringe chamber between the bottom barrel wall and the lower surface of the bottom plunger wall, and (b) the plunger-head annular seal forms a plunger-head fluid-tight seal between an outer surface of the plunger head and the cylindrical inner surface of the barrel; a barrel cap, which is (a) configured to be attachable to the top barrel opening so as to form a barrel-cap fluid-tight seal with the top barrel opening, and (b) shaped so as to define a cap opening through the barrel cap, wherein the plunger shaft is slidably disposed through the cap opening so as to form a plunger-head fluid-tight seal between the plunger shaft and a perimeter of the cap opening; a solid-dosage-form support disc, which (a) is disposed below the bottom plunger wall so as to define a grinding compartment between the lower surface of the bottom plunger wall and an upper surface of the solid-dosage-form support disc, and (b) is shaped so as to define a plurality of holes through the solid-dosage-form support disc; and a knob, wherein the closed-system grinding syringe is configured such that when (a) the solid dosage form is disposed in the grinding compartment, (b) the plunger head is inserted into the barrel, and (c) the closed-system grinding syringe is oriented upright, upon activation of the knob, the grinding compartment grinds the solid dosage form to a powder and at least 75% of the powder passes through the plurality of holes into a portion of the closed-system syringe chamber below the solid-dosage-form support disc." The '554 publication further discloses that "[i]t is noted that the air in closed-system syringe chamber 46 prior to introduction of liquid 73 is sufficiently compressible such that the force necessary to introduce liquid 73 can be readily applied manually by the healthcare worker." In addition, the '554 patent uses a "dual-needle closed-pressure equalization syringe" for pressure management within the device—"[t]he use of a dual-needle closed-pressure equalization syringe allows the injection of liquid 73 from a liquid compartment of the dual-needle closed-pressure equalization syringe into liquid channel 74 and the simultaneous return of gas from gas channel 78 into a separate gas compartment in the dual-needle closed-pressure equalization syringe."

While the '554 publication provides a system for crushing pills, it does not describe a simple, compact, and easy to handle device comprising a single chamber for grinding pills and for mixing the ground pill powder with water/liquid, thereby minimizing/eliminating and drug loss.

Hence, there is a need for a sealed, closed-loop pill crusher device which allows a user to pulverize pills and mix the pulverized pills with a liquid to create a suspension without the pulverized pills being exposed to the atmosphere, thereby eliminating the need for a caregiver or a medical professional to wear protective gear while crushing pills. There is also need for a sealed, closed-loop pill crusher system that is compact and easy to handle comprising a single chamber for grinding pills in addition to mixing the ground pill powder with liquid, thus eliminating any drug loss that is typically associated with transferring the crushed pills to a second chamber for mixing with liquid. Further, there is need for a pill crusher that is compatible with and can be connected to any syringe, and, in embodiments, a syringe that is used to administer the medication to a patient.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a device for grinding or crushing one or more pieces of solid medication, the device comprising: a male grinder component having a proximal end, a distal end, and a first plurality of serrated edges on an outer surface of the male grinder; a female grinder component defining a chamber for receiving the one or more pieces of solid medication, wherein the distal end of the male grinder component is configured to be at least partially received into the chamber of the female grinder component to form an enclosed chamber, wherein an outer surface of the chamber of the female grinder component comprises a second plurality of serrated edges, and wherein, as the male grinder component is rotated relative to the female grinder component, the first plurality of serrated edges is configured to move relative to the second plurality of serrated edges thereby grinding the one or more pieces of solid medication into a powder; a spring, wherein a distal end of the female grinder component is configured to receive the spring; a valve comprising a stopper member, wherein the valve is coupled with the spring; an adapter coupled with the valve and the distal end of the female grinder component, wherein the adapter is configured to selectively seal the enclosed chamber; and a filter positioned between the distal end of female grinder component and the adapter, wherein the filter is adapted to prevent liquid, medication powder, or a mixture thereof from passing through the device and wherein the filter is further adapted to allow air to pass in and out from the enclosed chamber.

Optionally, the device further comprises a syringe, wherein the adapter is a syringe adapter configured to receive the syringe, and wherein the syringe is configured to inject liquid into the enclosed chamber.

Optionally, each of the first plurality of serrated edges has a first end and a second end wherein spacings between the first ends of each of the first plurality of serrated edges is less than spacings between the second ends of each of the first plurality of serrated edges.

Optionally, the proximal end of the male grinder component comprises grooves for enabling a hand-grip of the male grinder component and a rotation thereof with respect to the female grinder component. Optionally, a length of the male grinder component ranging from 0.05 inches to 5 inches remains protruding above the female grinder component during crushing of the one or more pieces of solid medication.

Optionally, the device further comprises a retainer ring, wherein the proximal end of the female grinder component comprises a plurality of slots for receiving the retainer ring and wherein the retainer ring comprises a plurality of members adapted to couple to the male grinder component and prevent the male grinder component from disconnecting from the female grinder component during operation.

Optionally, the stopper member is configured to be pushed inside the spring when the syringe is connected to the syringe adapter. Optionally, upon the stopper member being pushed relative to the spring, at least one opening is adapted to be positioned in the enclosed chamber and allow the liquid to be mixed with the powder to form a liquid and powder mixture. Optionally, the device further comprises at least one sealing member coupled with the female grinder component for preventing the liquid and powder mixture from leaking out the enclosed chamber.

Optionally, the spring is characterized by a spring rate wherein the spring rate has a value ranging from 0.09 lbs/mm to 0.27 lbs/mm.

Optionally, at least a portion of the female grinder component is transparent to enable a user to view the grinding of the solid medication.

Optionally, the filter is a hydrophobic filter.

Optionally, the valve is a hollow member comprising at least one opening wherein the filter is positioned to surround the at least one opening to prevent the liquid, the medication powder, or the mixture thereof from passing through said at least one opening.

The present specification also discloses a method for crushing a pill and mixing the crushed pill with a liquid to create a suspension, the method comprising: placing one or more pills in a female grinder component comprising a chamber adapted to receive the one or more pills, wherein the female grinder component comprises a first plurality of serrated edges; inserting a male grinder component into the female grinder component to form an enclosed chamber with the female grinder component, wherein the male grinder component comprises a proximal end, a distal end and a second plurality of serrated edges, wherein the female grinder component is configured to receive a spring, wherein a valve comprising at least one opening is coupled with the spring, and wherein a filter is positioned proximate the at least one opening and is adapted to only allow air to pass in and out of the enclosed chamber; rotating the proximal end of the male grinder component with respect to the female grinder component to cause the first plurality of serrated edges to move relative to the second plurality of serrated edges and thereby crush the pill into a powder; attaching a syringe to an adapter coupled with the valve; using the syringe, injecting liquid through the valve and into the enclosed chamber; and using the syringe, suctioning out the liquid and powder mixture from the enclosed chamber.

Optionally, the filter is a hydrophobic filter.

Optionally, the method further comprises, after suctioning out the liquid and power mixture, injecting the liquid and power mixture back into the enclosed chamber, and repeating said suctioning out the liquid and powder mixture. Optionally, the method further comprises, after the repeated suctioning out of the liquid and powder mixture, disconnecting the syringe from the adapter and using the syringe to administer the liquid and powder mixture to a patient.

Optionally, the powder comprises particles having a size adapted to pass through a hole positioned within the valve wherein a diameter of the hole ranges from 1.25 mm to 5 mm.

Optionally, rotating the male grinder component with respect to the female grinder component generates a sound wherein, as the pill is crushed into the powder, the sound changes in pitch.

Optionally, at least a part of the enclosed chamber is viewable from outside the female grinder component.

The present specification also discloses a device for grinding or crushing one or more pieces of solid medication, the device comprising: a male grinder component having a first proximal end and a second distal end; a female grinder component comprising a first inner surface or chamber for receiving the one or more pieces of solid medication and a second outer surface, wherein the distal end of the male grinder component is at least partially inserted into a proximal end of the female grinder component for forming an enclosed chamber, wherein the female grinder component is adapted to contain the one or more pieces of solid medication, and wherein the male grinder component is configured rotate relative to the female grinder component, thereby enabling the one or more pieces of solid medication to be ground or crushed into medication powder; a spring coupled with a distal end of the female grinder component, wherein a portion of the inner surface of the female grinder component proximate a distal end of the female grinder component is configured to receive the spring; a hollow valve comprising a stopper member at a proximal end of the valve, wherein the valve is coupled with the spring at the proximal end and wherein the valve comprises at least two openings; a filter surrounding the at least two openings, wherein the filter is adapted to prevent liquid, medication powder, or a mixture thereof from passing through said openings, the filter allowing air to pass in and out from the enclosed chamber for enabling crushing of the one or more pieces of solid medication; and an adapter coupled with a distal end of the valve and the distal end of the female grinder component for sealing the enclosed chamber from the atmosphere.

Optionally, the adapter is a syringe adapter for receiving a syringe for mixing the medication powder with liquid being injected up from the distal end of the valve into the enclosed chamber by the syringe.

Optionally, the distal end of the male grinder component comprises serrated edges for grinding or crushing the solid medication.

Optionally, the proximal end of the male grinder component comprises grooves for enabling a hand-grip of the male grinder component and a rotation thereof with respect to the female grinder component. Optionally, a length of the male grinder component ranging from 0.05 inches to 0.2 inches remains protruding above the female grinder component during crushing of the one or more pieces of solid medication.

Optionally, the proximal end of the female grinder component comprises a plurality of slots for enabling a retainer ring to be fitted therein, the retainer ring comprising a plurality of tabs for preventing disconnection of the male grinder component from the female grinder component during operation of the device.

Optionally, the stopper member is pushed inside the spring due to connection of the syringe to the syringe adapter, causing the pair of openings to enter the enclosed chamber for allowing the liquid to be mixed with the medication powder forming a liquid mixture. Optionally, the device further comprises at least one sealing member coupled with an inner surface proximate the proximal end of the female grinder component for preventing the liquid mixture from leaking out of a connection point between the male grinder component and the female grinder component. Optionally, the liquid mixture is pushed back and forth from the syringe to the enclosed chamber one or more times for enabling complete mixing of the medication powder with the liquid, wherein the syringe may be disconnected and reconnected one or more times to the syringe adapter for enabling complete mixing of the medication powder with the liquid and subsequently removal of the liquid mixture from the device.

Optionally, the spring rate of the spring ranges from 0.09 lbs/mm to 0.27 lbs/mm.

Optionally, at least a portion of a wall of the female grinder component is transparent for enabling viewing of the solid medication being ground or crushed.

Optionally, the filter is a hydrophobic filter.

The present specification also discloses a method for crushing and liquefying a pill comprising: placing one or more pills in a female grinder component comprising a first inner surface or chamber for receiving the one or more pills and a second outer surface; inserting a cylindrical male grinder component having a first proximal end and a second distal end into the female grinder component for forming an enclosed crushing chamber within the female grinder component, wherein a portion of the inner surface of the female grinder component proximate a distal end of the female grinder component is configured to receive a spring and wherein a proximal end of a hollow cylindrical valve comprising at least two openings is coupled with the spring and wherein a cylindrical hollow filter surrounds the pair of openings for preventing pill particles or water/liquid from passing through said openings, the filter allowing air to pass in and out of the crushing chamber for enabling crushing of the one or more pills; rotating the proximal end of the male grinder component with respect to the female grinder component for crushing the pills to obtain the pills powder; pushing water/liquid using a syringe connected to a syringe adapter coupled with a distal end of the valve, up through the hollow valve into the crushing chamber via the pair of openings, wherein the connection of the syringe to the syringe adapter causing the pair of openings to be exposed to the pills powder in the crushing chamber, and the water/liquid mixing with the crushed pills powder forming the liquid pills powder mixture; and suctioning out the liquid mixture from the female grinder component into the syringe for administration to a patient.

Optionally, the filter is a hydrophobic filter.

Optionally, the liquid is pushed into the crushing chamber and suctioned out into the syringe a plurality of times for completely mixing the water/fluid with the pills powder, wherein the syringe may be disconnected and reconnected one or more times to the syringe adapter for enabling complete mixing of the pills powder with the water/fluid.

Optionally, the syringe is an Enfit syringe.

Optionally, the syringe is used to administer the liquid pills powder mixture to a patient.

Optionally, the pills powder comprises particles that can pass through a hole positioned within the valve to be mixed with the water/liquid, wherein a diameter of the hole ranges from 1.25 mm to 5 mm.

Optionally, rotating the proximal end of the male grinder component with respect to the female grinder component for crushing the pills to obtain the pills powder emits a sound with changing pitch for indicating a completion of the crushing.

Optionally, a transparent portion of a wall of the female grinder component provides a visual indication of a completion of the crushing of the pills.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skill in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 2O is a table illustrating exemplary parameters of a spring that may be used with the device of the present specification;

FIG. 6 is a flowchart illustrating exemplary steps of operation of the pill crusher device shown in FIGS. 5A-5H, in accordance with an embodiment of the present specification;

DETAILED DESCRIPTION

Figure 1B:
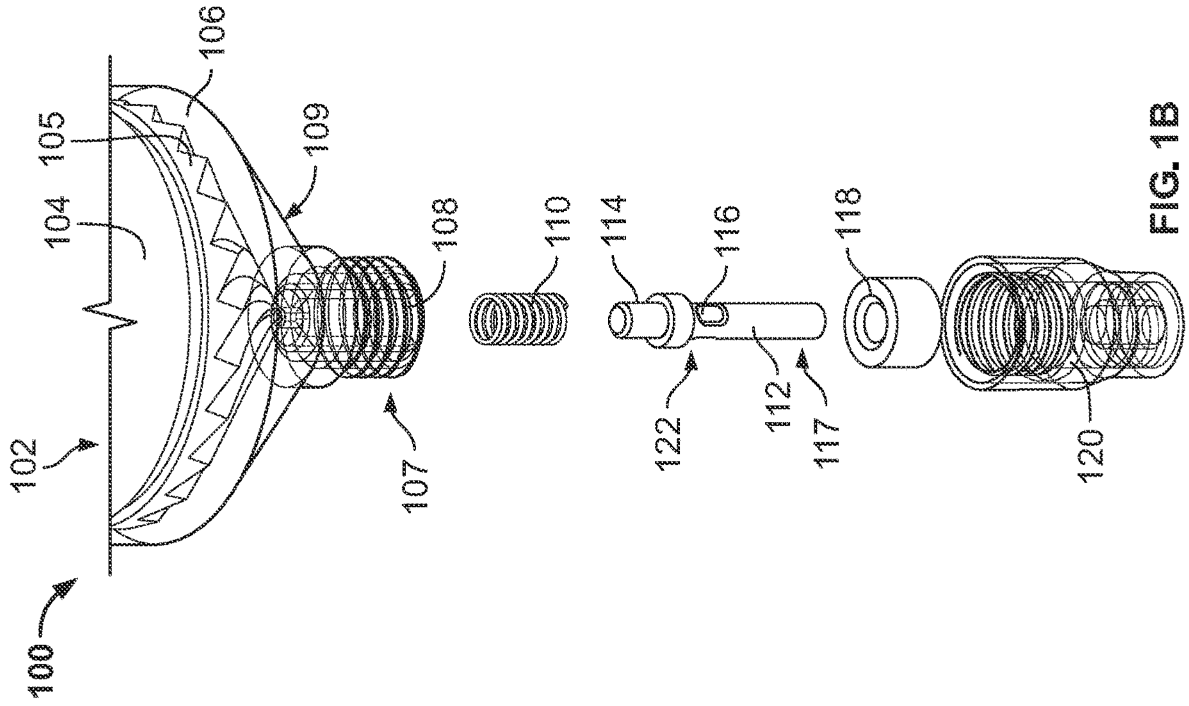
FIG. 1B is an exploded, perspective view of the pill crusher device shown in FIG. 1A, in accordance with an embodiment of the present specification.

In an embodiment, the present specification provides a sealed, closed-loop pill crusher device, which allows a user to crush pills and mixed the crushed pills with a liquid to create a suspension without the crushed pills being exposed to the atmosphere. The pill crusher device thereby allows a caregiver or a medical professional to crush pills without being exposed to the pill dust which may be hazardous. Therefore, in embodiments, the pill crusher device described herein eliminates the need for a user to wear protective garments/gear for crushing pills. In embodiments, the pill crusher is a compact and easy to handle device comprising a single chamber for pulverizing pills as well as mixing the ground pill powder with liquid. Further in embodiments, the pill crusher device pulverizes pills such that they can enter a hole positioned within the valve to then be mixed with a liquid. In an embodiment, the pill powder may pass through the hole having a diameter ranging from 1.25 mm to 5 mm and preferably approximately 2.5 mm. Thus, the diameter may decrease up to 50% and may increase up to 100%. In an embodiment, the pill crusher device provides both auditory and visual means for a user to ascertain that solid medication has been crushed to a requisite degree.

In embodiments, the pill crusher device eliminates significant medication waste, and more importantly, loss of intended dose, since the entire pill is fully crushed in a closed environment without being exposed to the atmosphere. The device also ensures thorough mixing of the pill powder with a liquid, such as water, since the liquid and pill powder mixture flows back and forth between a syringe and the same closed environment (chamber) in which the pill is crushed. In various embodiments, any size syringe may be used with the pill crusher device described in the present specification, for mixing the ground pill powder with liquid. In embodiments, the syringe may also be used to administer the medication to the patient. It should be noted herein that the syringe is independent from the pill crusher device described in the present specification.

Further, in an embodiment, the present pill crusher device is designed to avoid unwanted pressure increases within a closed grinding chamber of the device by providing a filter that allows only air and not pill particles to pass through and out of the chamber when the syringe is not attached, yet also allows for liquid to pass into and out of the chamber when the syringe is attached. Thus, in embodiments, the syringe is used to open the valve.

In the description and claims of the application, each of the words “comprise”, “include”, “have”, “contain”, and forms thereof, are not necessarily limited to members in a list with which the words may be associated. Thus, they are intended to be equivalent in meaning and be open-ended in that an item or items following any one of these words is not meant to be an exhaustive listing of such item or items or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms “a,” “an,” and “the” include plural references unless the context dictates otherwise. Although any systems and methods similar or equivalent to those described herein can be used in the practice or testing of embodiments of the present disclosure, the preferred systems, devices, and methods are now described.

In embodiments, the term "serrated" refers to having or denoting a jagged edge, while the term "serration" refers to a tooth or a point on the edge of a serrated surface.

In embodiments, the term "liquefying" is defined as mixing crushed solid medication with a liquid to create a suspension.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

It should also be noted that while the various components described herein may be described with reference to a particular embodiment, the components are interchangeable and may be used in any combination such that the device achieves the objectives described in the present specification.

Figure 1A:
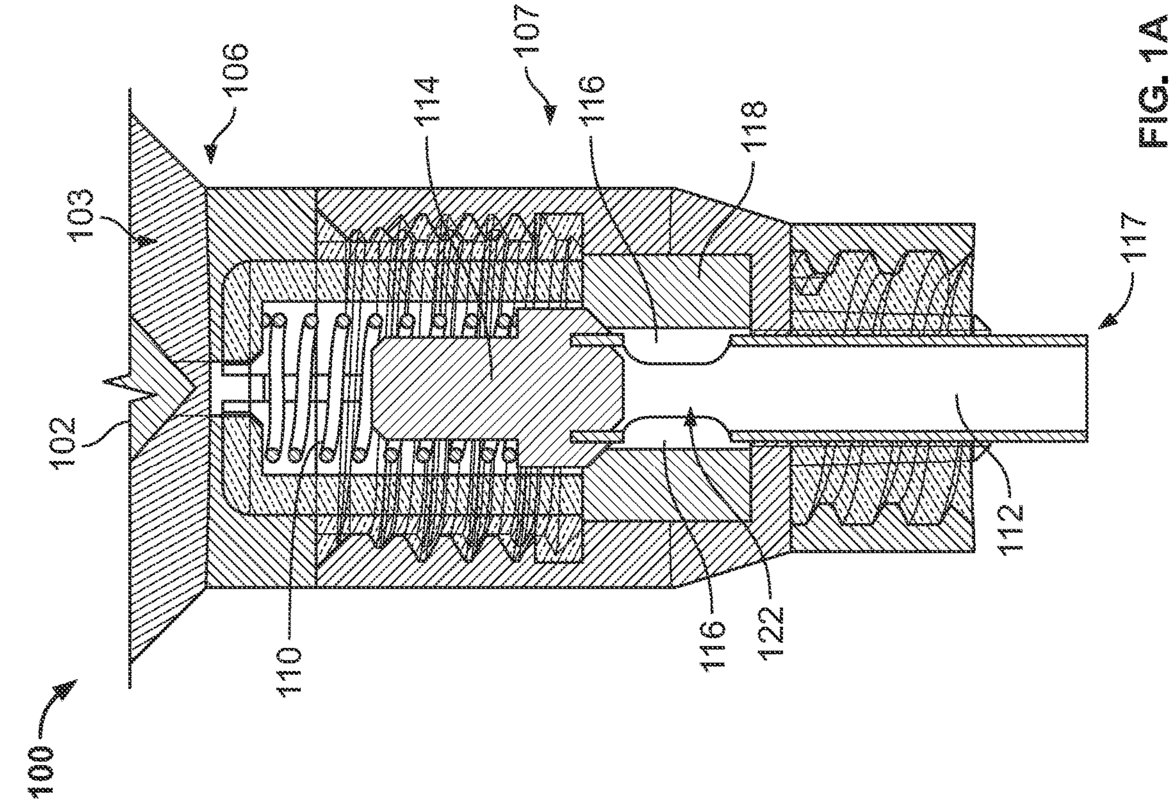
FIG. 1A is a cross-sectional side view illustration showing various components of a pill crusher device, in accordance with an embodiment of the present specification.

FIG. 1A is a side plan view illustration showing various components of a pill crusher device, in accordance with an embodiment of the present specification. FIG. 1B is an exploded, perspective view of a portion of the pill crusher device shown in FIG. 1A, in accordance with an embodiment of the present specification. Referring to FIGS. 1A and 1B, device 100 comprises a convex male grinder component 102, having a first smooth inner surface 104 and an opposing second outer surface 105 comprising serrated edges having serrations or teeth as shown in FIG. 1B, for aiding in the crushing of pills. Device 100 further comprises female grinder component 106 having an inner surface 103 and an opposing outer surface 109. In embodiments, the female grinder component 106 is hollow and/or funnel-shaped. In embodiments, the female grinder component 106 also comprises serrated edges having serrations or teeth extending outward from its inner surface. It should be appreciated that, while the male portion 102 is described as convex and the female portion 106 is described as funnel-shaped, the male portion 102 and female portion 106 could be any shape provided a) the female portion 106 is configured to receive male portion 102 and b) once received into the female portion 106, at least a part of the male portion 102 physically contacts the female portion 106 to form opposing and mated grinding surfaces. Accordingly, in an alternative embodiment, the male portion 102 may have a cylindrical outer surface while the female portion 106 may have a slightly larger cylindrical inner chamber for receiving the male portion 102. In another alternative, the male portion 102 may have a curved outer surface, while the female portion 106 has a slightly larger, yet curved inner chamber to complement and mate with male portion 102. Still alternatively, the male portion 102 may have a convex outer surface while the slightly larger inner surface/chamber of the female portion 106 is funnel-shaped and configured to receive male portion 102.

In embodiments, the inner surface 103 of the female grinder component 106 forms a chamber for receiving solid medication, such as pills, such that they can be crushed or ground. The inner surface/chamber 103 of the female grinder component 106 is configured to receive the second, serrated surface 105 of the male grinder component 102, wherein the second serrated surface 105 of the male grinder component 102 and the inner surface 103 of the female grinder component 106 form an enclosed grinding or crushing chamber. In embodiments, the inner surface 103 of the female grinder component 106 also comprises serrated edges having serrations or teeth. In embodiments, and with respect to the discussion below, it should be noted that the male grinder component is rotated upon insertion into the female grinder component. Therefore, the rotational directions described herein refer to the movement of the male grinder component with respect to the female grinder component.

In embodiments, the term "serrated" refers to having or denoting a jagged edge, while the term "serration" refers to a tooth or a point on the edge of a serrated surface. In embodiments, the outer surface the male grinder component is provided with serrated edges for aiding in the pulverization of the pills, which occurs when the distal end of the male grinder component is inserted into and rotated with respect to the female grinder component. In embodiments, the inner surface/chamber of the female grinder component is provided with serrated edges for aiding in the pulverization of the pills, which occurs when a distal end of the male grinder component is inserted into and rotated with respect to the female grinder component. In embodiments, the serrations comprise a plurality of teeth having a predefined depth, shape, number, orientation and permit or enable a clockwise or a counterclockwise rotation of the male grinder component with respect to the female grinder component. The plurality of teeth aid in reducing the effort required for grinding/crushing pills placed in the female grinder component so that the device is easy and convenient to use. In embodiments, a number of teeth provided on an outer surface the male grinder component and an inner surface of the distal end of the female grinder component of the pill crusher device of the present specification may range from 1 to 100. In embodiments, depth of a tooth measured from a tip to base measured axially ranges from 0.5 mm to 10 mm. In embodiments the teeth may be designed in a plurality of shapes. In embodiments, the serrations allow for or enable rotation in a clockwise direction, counterclockwise direction or both.

FIGS. 1D-1J illustrate a plurality of shapes or designs of the serrated edges that may be provided on an outer surface of the male grinder component or an inner surface/chamber of the female grinder component of the pill crusher device, in accordance with embodiments of the present specification. Note that while FIGS. 1D-1J, illustrate both a top-down and side plan views of the serrations of the male grinder component, it should be understood that the female grinder component may have corresponding serrations with an opposing pattern. Thus, the serrations on both the male grinder component and female grinder components will work in combination for the desired clockwise, counter-clockwise or bi-directional motion. In embodiments, where the male grinder component comprises clockwise serrations, the female grinder component comprises clockwise serrations. In embodiments, where the male grinder component comprises counterclockwise serrations, the female grinder component comprises counterclockwise serrations. In embodiments, the male grinder component and the female grinder component comprise serrations having opposing directionality. In various embodiments, the serrated surfaces of the male and female grinder components are designed to be matching, such that the serrated surfaces intermesh with each other when the male grinder component is inserted into the female grinder component and pills placed in the female grinder component are completely crushed. This is required to minimize a volume of liquid left behind in the device once the crushed pills are mixed with a liquid to create a suspension and said liquid suspension is drawn out through the device via a syringe.

It should further be appreciated that, in one embodiment, the serrated edges of the male grinder component converge at one end of the outer surface of the male grinder component and, as the serrated edges extend downward and over the outer surface of the male grinder component, diverges so that the spacing between a first and second serrated edge (and therefore the teeth located on the first and second serrated edges) increases as one move from a top end of the outer surface of the male grinder component to a bottom end of the outer surface of the male grinder component.

In embodiments, the clockwise or counterclockwise rotation occurs due to the directional interaction of the serrations which either create a shearing action or crushing action based on movement. FIG. 1D illustrates serrations provided on a surface of the male/female grinder component of the pill crusher device, having a nine-tooth design enabled for clockwise rotation of the male grinder component with respect to the female grinder component, in accordance with an embodiment of the present specification. As can be seen in cross sectional view 170 and perspective view 171, nine teeth 172 or serrated edges are provided, arranged such that they can be rotated in a clockwise direction. In embodiments, the teeth enabled for clockwise rotation of the male grinder component with respect to the female grinder component are designed to be more aggressive when turned in the clockwise direction and are more likely to catch and shear the pills. When the teeth provided on surfaces of the male and female grinder components start to intermesh, the slope of the teeth become locked due to the aggressive angle of design. In embodiments, back-slopes on said teeth allow the teeth to 'ratchet' over each other when rotated in a counter-clockwise direction, which allows a user to repeat the grinding motion without having to reposition their hands.

Figure 1C:
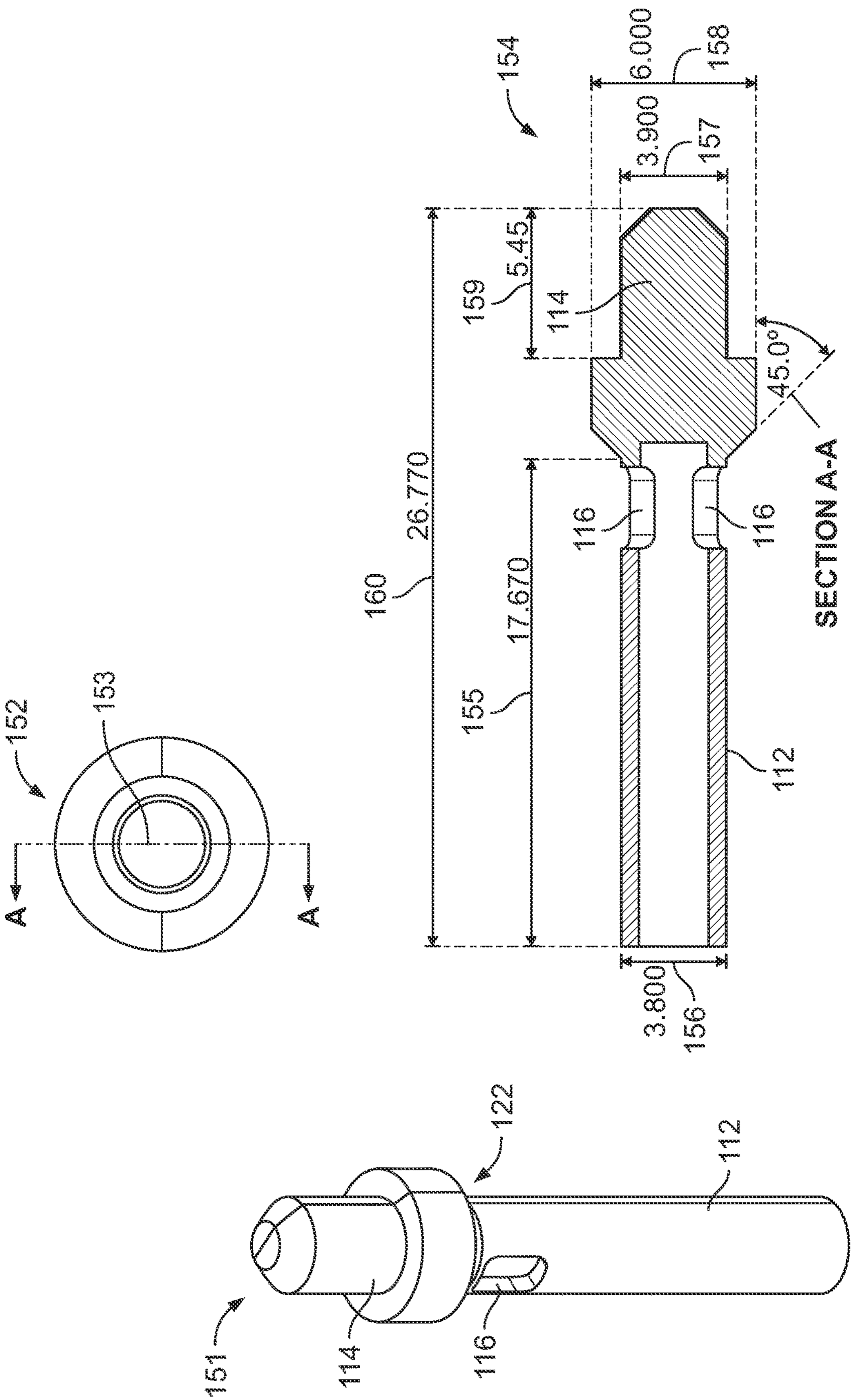
FIG. 1C is a perspective view, a cross-sectional view, and a side plan view of the valve and stopper member shown in FIG. 1A, in accordance with an embodiment of the present specification.
Figure 1D:
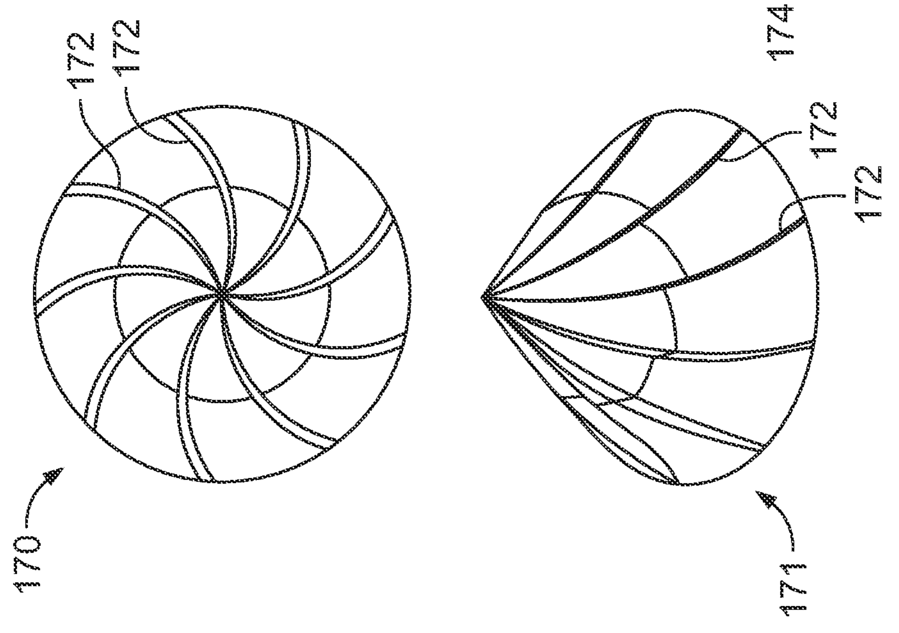
FIG. 1D shows both a top-down and side plan view of serrations provided on a surface of the male/female grinder component of the pill crusher device, having a nine-tooth design enabled for clockwise rotation of the male grinder component with respect to the female grinder component, in accordance with an embodiment of the present specification.
Figure 1E:
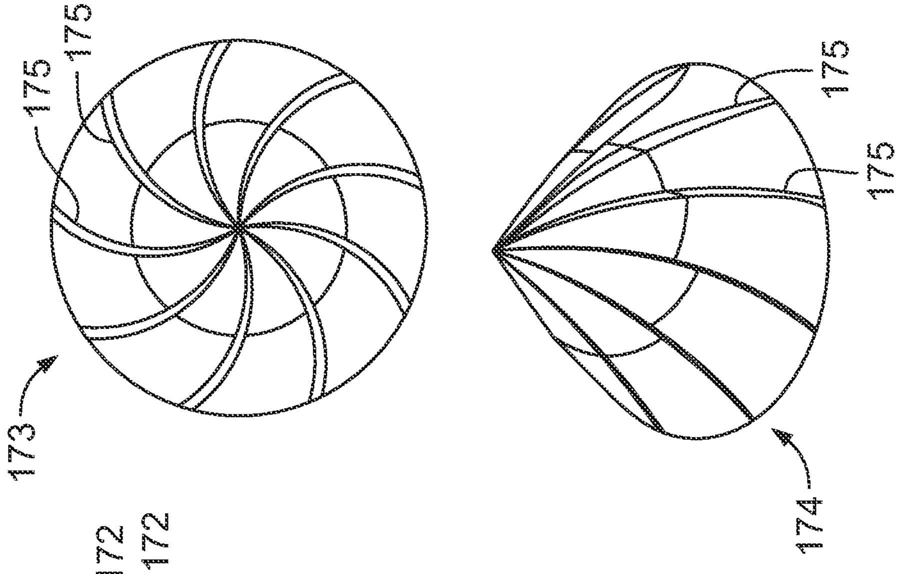
FIG. 1E illustrates both a top-side and side plan view of serrations provided on a surface of the male/female grinder component of the pill crusher device, having a nine-tooth design enabled for counter-clockwise rotation of the male grinder component with respect to the female grinder component, in accordance with an embodiment of the present specification.

FIG. 1E illustrates serrations provided on a surface of the male/female grinder component of the pill crusher device, having a nine-tooth design enabled for counter-clockwise rotation of the male grinder component with respect to the female grinder component, in accordance with an embodiment of the present specification. As can be seen in cross sectional view 173 and perspective view 174, nine teeth 175 or serrated edges are provided, arranged such that they can be rotated in a counterclockwise direction.

Figure 1F:
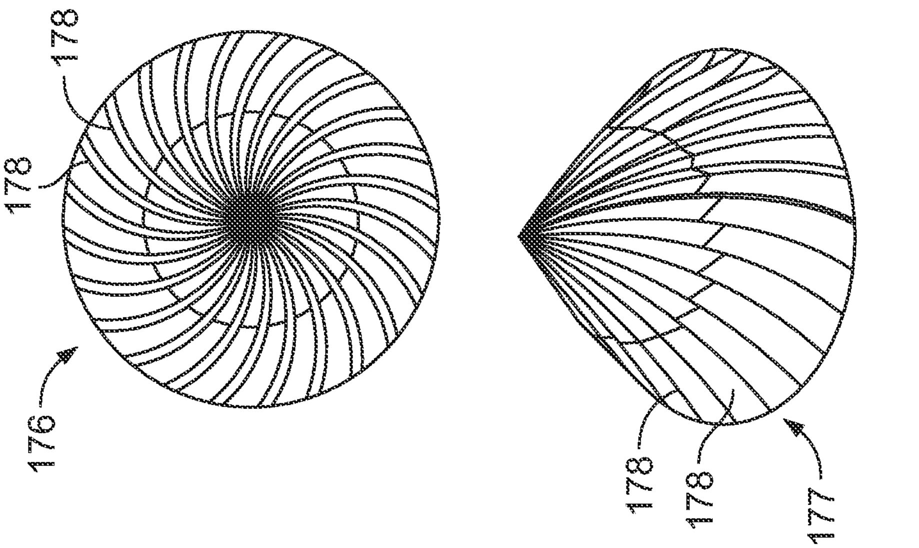
FIG. 1F illustrates a top-down and side plan view of serrations provided on a surface of the male/female grinder component of the pill crusher device, having a twenty-four tooth design enabled for counter-clockwise rotation of the male grinder component with respect to the female grinder component, in accordance with an embodiment of the present specification.

FIG. 1F illustrates serrations provided on a surface of the male/female grinder component of the pill crusher device, having a twenty-four tooth design enabled for counter-clockwise rotation of the male grinder component with respect to the female grinder component, in accordance with an embodiment of the present specification. As can be seen in cross sectional view 176 and perspective view 177, twenty-four teeth 178 or serrated edges are provided, arranged such that they can be rotated in a counter-clockwise direction.

Figure 1I:
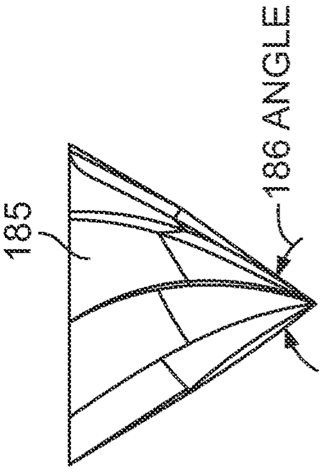
FIG. 1I is a perspective view of serrations provided on a surface of the male/female grinder component of the pill crusher device, showing an angle of the teeth, in accordance with an embodiment of the present specification.
Figure 1J:
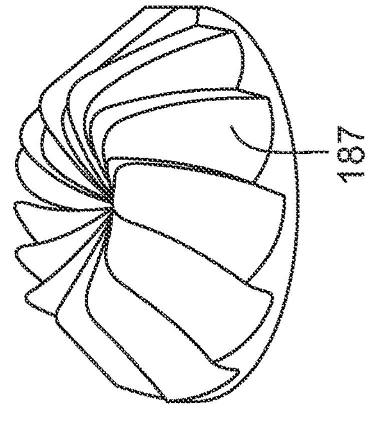
FIG. 1J is a perspective view of serrations provided on a surface of the male/female grinder component of the pill crusher device, showing inverted teeth, in accordance with an embodiment of the present specification.
Figure 1H:
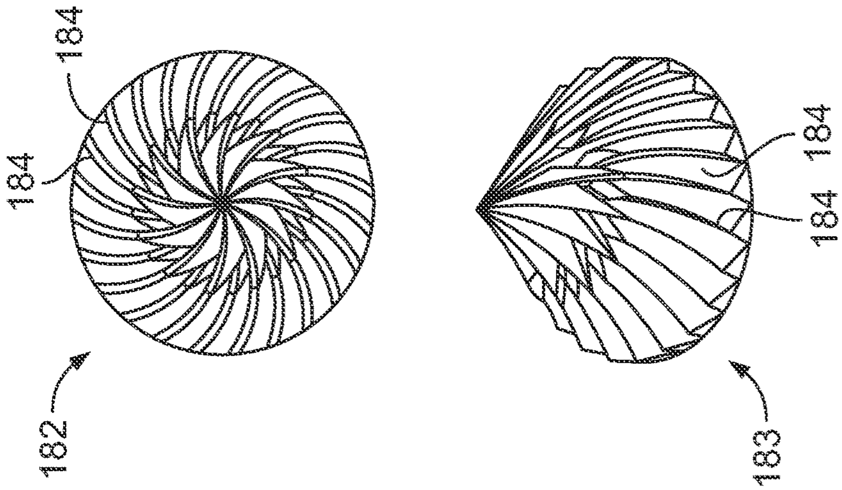
FIG. 1H illustrates a top-down and side plan view of serrations provided on a surface of the male/female grinder component of the pill crusher device, having a plurality of teeth enabled for counterclockwise rotation of the male grinder component with respect to the female grinder component, in accordance with an embodiment of the present specification.
Figure 1G:
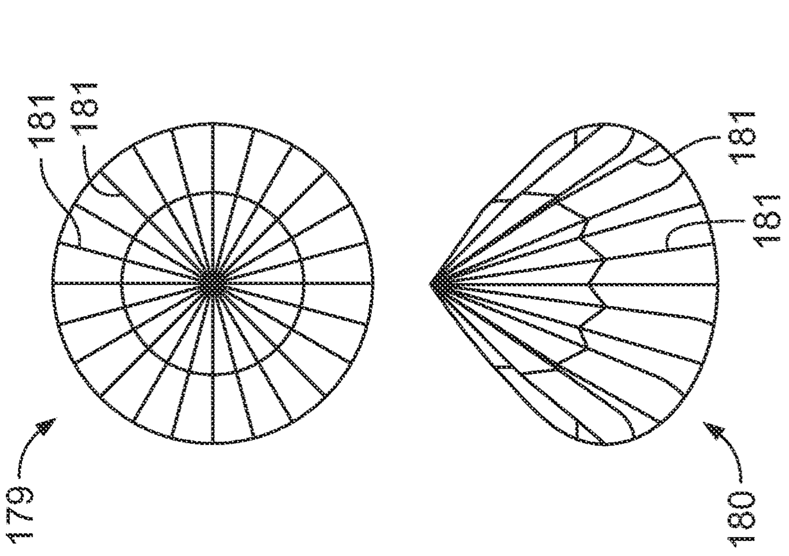
FIG. 1G illustrates a top-down and side plan view of serrations provided on a surface of the male/female grinder component on the distal end of the pill crusher device, having a twelve-tooth design enabled for clockwise or counterclockwise rotation of the male grinder component with respect to the female grinder component, in accordance with an embodiment of the present specification.

FIG. 1G illustrates serrations provided on a surface of the male/female grinder component on the distal end of the pill crusher device, having a twelve-tooth design enabled for either clockwise or counterclockwise rotation of the male grinder component with respect to the female grinder component, in accordance with an embodiment of the present specification. As can be seen in cross sectional view 179 and perspective view 180, twelve teeth 181 or serrated edges are provided, and arranged symmetrically, such that the rotation can be either clockwise or counterclockwise.

FIG. 1H illustrates serrations provided on a surface of the male/female grinder component of the pill crusher device, having a plurality of teeth enabled for counter-clockwise rotation of the male grinder component with respect to the female grinder component, in accordance with an embodiment of the present specification. As can be seen in cross sectional view 182 and perspective view 183, a plurality of teeth 184 or serrated edges are provided and arranged in a counter-clockwise design.

FIG. 1I is a perspective view of serrations provided on a surface of the male/female grinder component of the pill crusher device, showing an angle of the teeth, in accordance with an embodiment of the present specification. In embodiments, an angle of placement 186 of each tooth 185 may range from 0 degrees to 180 degrees. In a preferred embodiment the angle of placement 186 ranges from 45 degrees to 60 degrees, and in a particular embodiment, the angle of placement 186 is 60 degrees. In embodiments, a smaller angle of placement of the teeth provides a mechanical advantage to a user for putting pressure on pills placed in a female grinder component of a pill crusher device for crushing said pills; since the angle of placement is inversely proportional to a downward force transferred perpendicular to the crushing surface. Hence, in an exemplary embodiment, it is advantageous to have the angle of placement 186 as 60 degrees, instead of, for example, 135 degrees, as the smaller the angle of placement the bigger is the mechanical advantage gained. In other embodiments, a larger angle of placement of the teeth provides a compact design feature. In some embodiments, differing angles of placement may be defined for a same tooth, since the surface of the male grinder component comprising said teeth is conical a number of teeth reduce near a distal tip of the component.

FIG. 1J is a perspective view of serrations provided on a surface of the male or female grinder component of the pill crusher device, showing inverted teeth, in accordance with an embodiment of the present specification. In an embodiment, teeth 636 are inverted at a mid-point along their length. Inverted teeth 187 provide a design wherein pills placed in a female grinder component of a pill crusher device fall to the sides of the teeth when a male grinder component inserted into the female grinder component is rotated for crushing said pills, thereby causing said crushing to be carried out easily and more efficiently. Further, in a non-inverted teeth design some pills may get stuck in a tip portion of the male grinder component, thereby preventing carrying out the crushing process by a user. Hence, the inverted teeth design eliminates such problems, thereby allowing said crushing to be carried out easily.

In embodiments, a portion of the inner surface 103 of the female grinder component 106, located at a distal end 107 of the female grinder component 106, is configured to receive or be coupled with a spring 110, which, in turn, is configured to receive or be coupled with a valve 112. In an embodiment, the portion of the inner surface 103 of the female grinder component 106 that is located at a distal end 107 of the female grinder component 106 is cylindrical in shape and is sized/designed such that the spring 110 fits snugly therein as shown in FIG. 1A. In embodiments, the distal portion of the female grinder component 106 is narrower than a proximal portion/mouth/opening that is configured to receive the male grinder component 102. Valve 112 is preferably a hollow elongated member having a proximal end 122 and a distal end 117. A stopper member 114 is coupled with the proximal end 122, wherein the stopper member 114 fits into the spring 110 forming a sealed contact. Thus, when a pill is pulverized in the crushing chamber formed within the female grinder component 106 due to insertion of the male grinder component 102, the stopper member 114 prevents any material from exiting out of the distal end 107 of the female grinder component 106. In one embodiment, the stopper member 114 and valve 112 may be formed as a single component and not as two discrete pieces/components.

Valve 112 further comprises at least two side openings 116. In embodiments, the side openings 116 of valve 112 enable an avoidance of excessive pressure buildup in the closed grinding chamber of the device 100, by allowing air to pass in and out of the grinding chamber for creating an up/down motion of the male grinder component 102 with respect to the female grinder component 106, thereby enabling crushing of the pills. Thus, in embodiments, the air travels through a filter before leaving through the valve 112, allowing for air to move in and out of the device 100 while pills are being crushed in the device. In embodiments, valve 112 is enveloped in a filter 118, which, in an embodiment is cylindrical. In an embodiment, the filter 118 is a hydrophobic filter which allows only air to pass through, preventing liquid or solid particles from flowing in or out of the side openings 116. In embodiments, filter 118 also prevents foreign items from entering the device 100 from the outside. In an embodiment, the filter 118 is a porous polymer filter, however, in other embodiments, a variety of suitable materials may be used for filter 118. In an embodiment, filter 118 is a polyethylene filter. In embodiments, the filter is fabricated using a porous polymer, having a porosity ranging from 5 microns to 60 microns.

FIG. 1C illustrates multiple views of the valve 112 and stopper member 114 shown in FIG. 1A, in accordance with an embodiment of the present specification. A perspective view 151 illustrates valve 112 including at least one opening 116 and a stopper member 114 coupled to a proximal end 122 of valve 112. A top plan view 152 corresponding to the perspective view 151 shows that valve 112 and the stopper member 114 have a circular cross section, which when sliced through a sectional line 153 provides a sectional view 154. As can be seen in cross-sectional view 154, valve 112 forms a hollow tube, and in an embodiment, has a length 155 of 17.670 mm and a diameter 156 of 3.800 mm. In an embodiment, the stopper member 114 has a first diameter 157 of 3.9 mm, a second diameter 158 of 6 mm, and a length 159 of 5.45 mm, wherein the first thickness is smaller than the second thickness. The total length 160 of the valve 112 and the stopper member 114 is 26.77 mm, in an embodiment. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

In embodiments, the pill crusher device of the present specification is designed for pediatric use and has smaller dimensions than those described above. In an embodiment, the pill crusher device designed for pediatric use has dimensions which are 25% to 30% smaller than a pill crusher device designed for adult usage. An exemplary design and dimensions of the pill crusher device for pediatric use is illustrated in FIG. 5H below.

It should be noted herein that the dimensions provided herein and throughout the specification are meant to be exemplary in nature only and that these dimensions can change, as long as the device meets the objectives of the present specification. In addition, when a particular component changes in size, in embodiments, the other components are also adjusted proportionately if needed to achieve the objectives of the present specification.

In addition, the distal end 107 of the female grinder component 106 may, in some embodiments, comprise a portion 108 that is configured to be coupled with a valve housing/syringe adapter 120. In embodiments, the valve housing/syringe adapter 120 may be glued onto the distal end 107, in which case the portion 108 is smooth/not threaded. In embodiments, the portion 108 is threaded to enable a screw fit of the valve housing/syringe adapter 120, in which case device 100 is provided as a reusable device. The threading of the portion 108 enables removal of the valve housing/syringe adapter so that the filters and adapters may be changed for reuse of the device 100. In an embodiment, various components of the device 100 may be fabricated from plastic and/or metal and/or silicon or a mixture thereof.

Figure 1K:
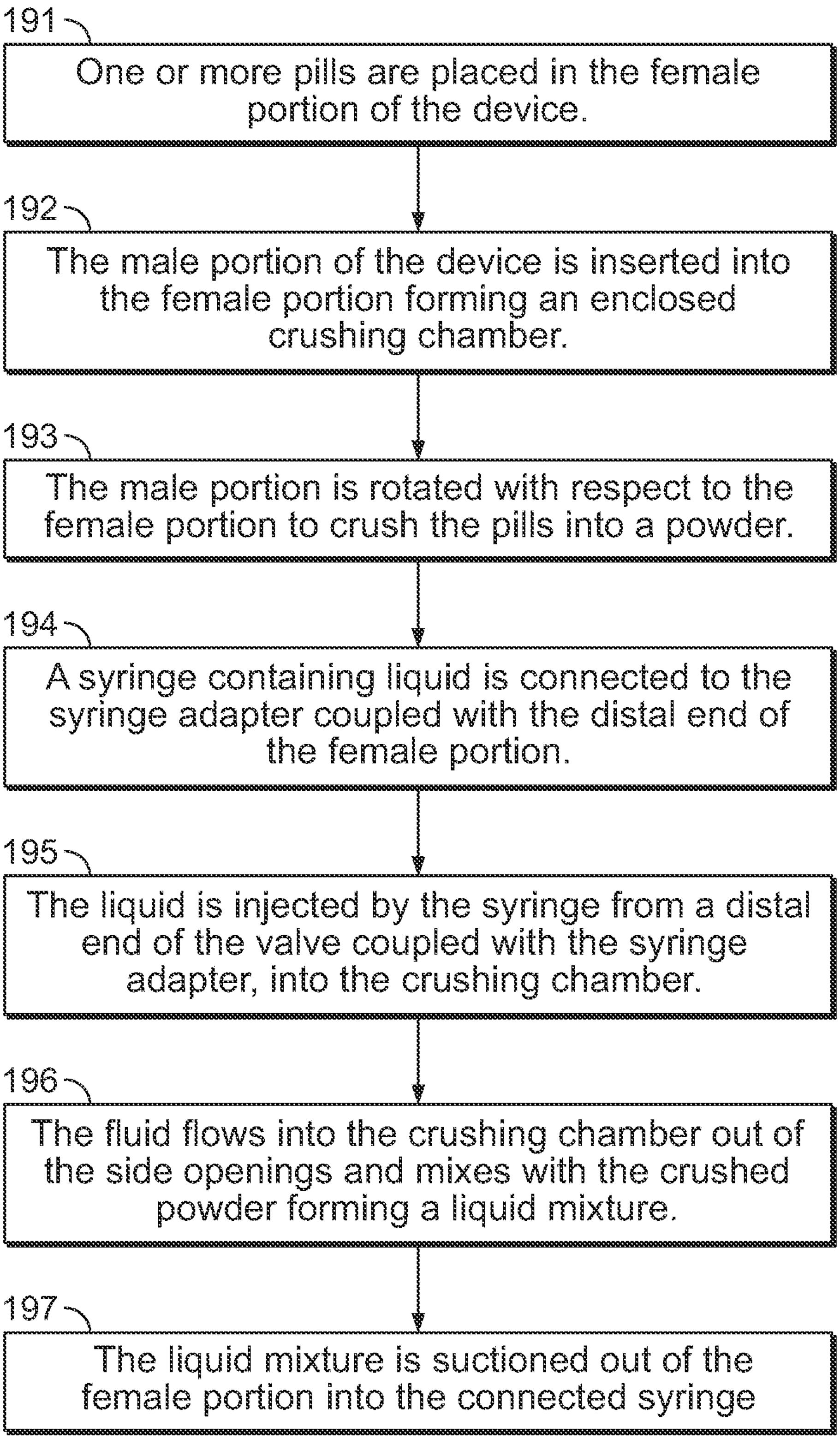
FIG. 1K is a flowchart illustrating the steps pf operation of the pill crusher device shown in FIG. 1A, in accordance with an embodiment of the present specification.

FIG. 1K is a flowchart illustrating the steps pf operation of the pill crusher device shown in FIG. 1A, in accordance with an embodiment of the present specification. Referring to FIGS. 1A and 1K, at step 191, one or more pills to be crushed are placed within the female grinder component 106 such that they are received by the inner surface/chamber 103. At step 192, the male grinder component 102 is inserted into the female grinder component 106, forming a crushing chamber within the female grinder component 106 where the crushing is effectuated by the outer serrated surface 105 of the male grinder component 102 and the inner surface/chamber 103 of the female grinder component 106. At step 193, the pills are crushed, by rotating the male grinder component 102 with respect to the female grinder component 106. In an embodiment, the male grinder component 102 is rotated in a clockwise direction with respect to the female grinder component 106. At step 194, once the one or more pills are crushed, a syringe (not shown) containing water/fluid is connected to the syringe adapter 120. At step 195 water/fluid is injected by the syringe via the distal end 117 of the valve 112 up through the hollow length of the valve 112 towards the proximal end 122, into the crushing chamber. In embodiments, the connection of the syringe to the syringe adapter 120 creates an upwards force pushing the stopper member 114 up through the spring 110 into the crushing chamber within the female grinder component 106. At step 196, the water/fluid to flows out of the side openings 116 of valve 112 into the crushing chamber and mixes with the powder of the crushed pills forming a liquid mixture. At step 197 the liquid mixture is suctioned out by using the syringe aided by the side openings 116. The device 100 allows the fluid to be thoroughly mixed with the pill powder by enabling the liquid mixture to flow back and forth between the syringe and the crushing chamber as many times as required by the user. In various embodiments, any size syringe may be used with the pill crusher device 100 and in embodiments, the same syringe that is required to be administered to a patient may be used with the pill crusher device 100 for mixing the powder with fluid. In embodiments, the syringe is an Enfit syringe.

Figure 2C:
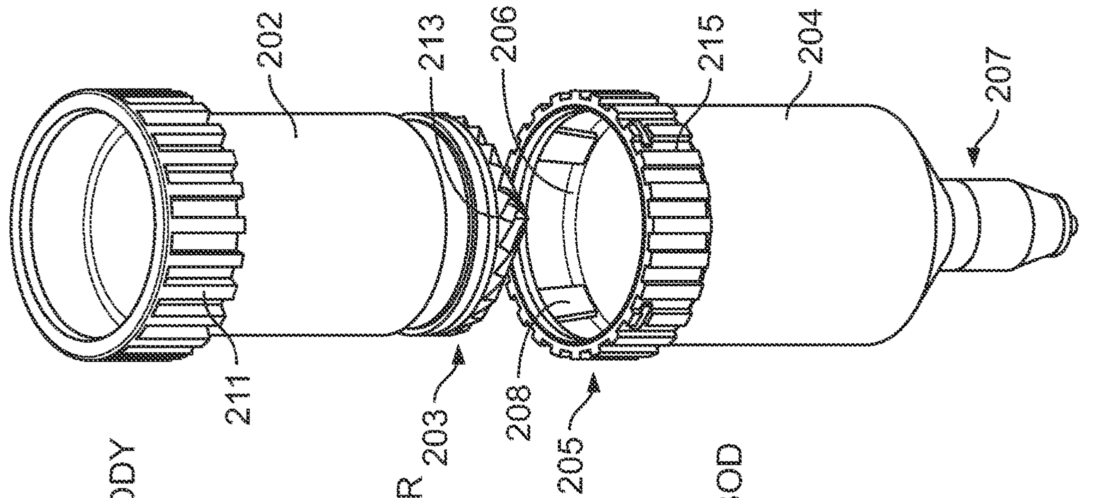
FIG. 2C is a perspective view showing male and female grinder components of the pill crusher device shown in FIG. 2A.
Figure 2B:
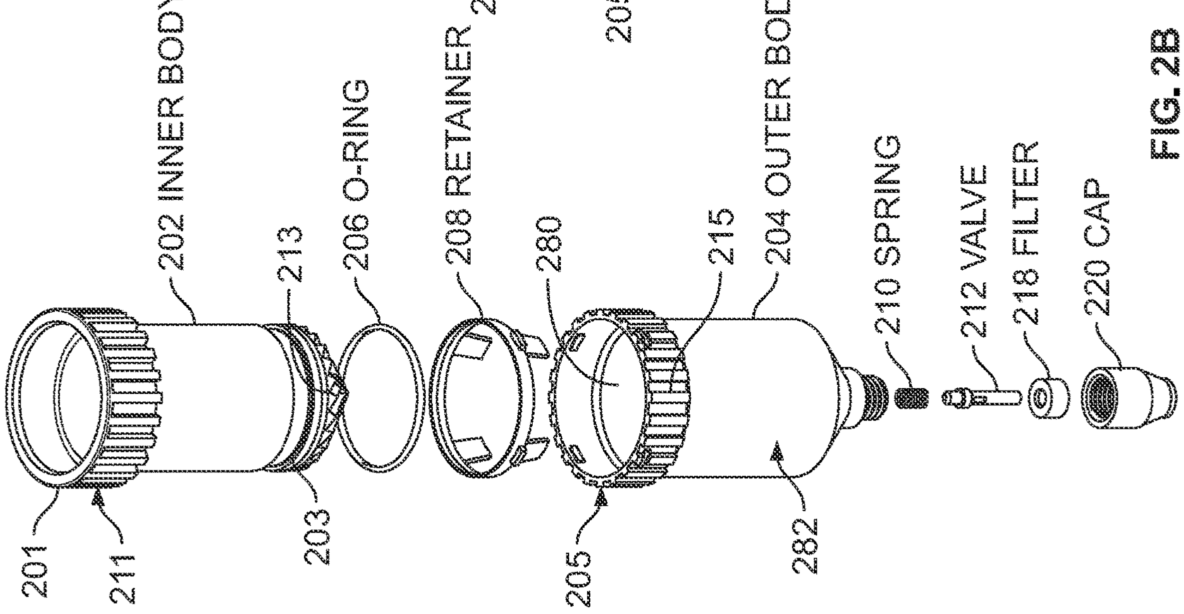
FIG. 2B is an exploded perspective view of exemplary components of the pill crusher device shown in FIG. 2A, in accordance with an embodiment of the present specification.
Figure 2A:
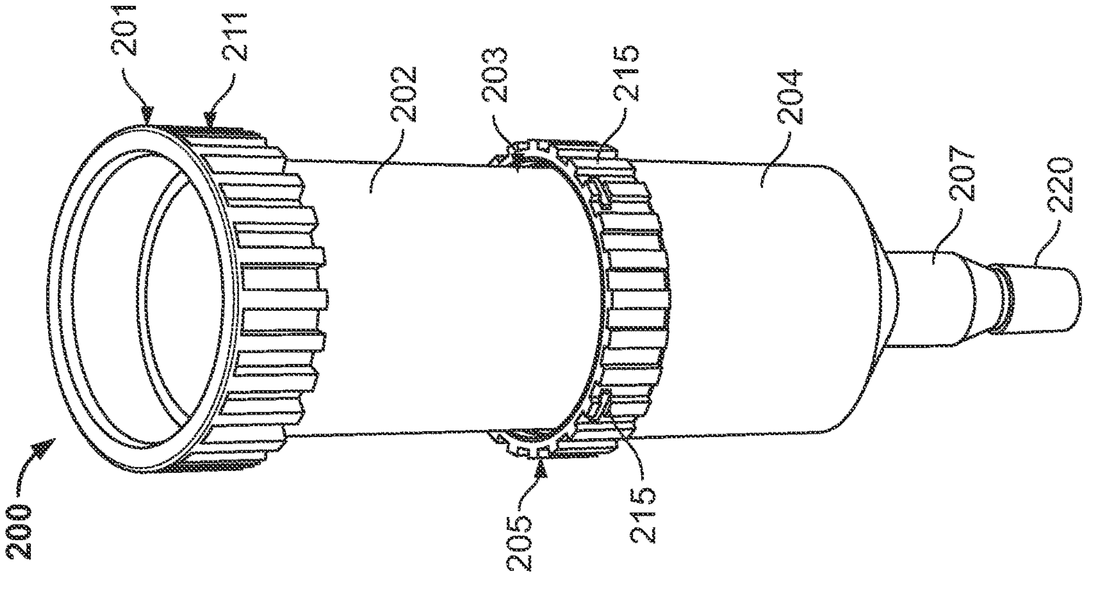
FIG. 2A is a perspective view illustration of a pill crusher device, in accordance with an embodiment of the present specification.

FIG. 2A is a perspective view illustration of a pill crusher device, in accordance with an embodiment of the present specification. FIG. 2B is an exploded perspective view of exemplary components of the pill crusher device shown in FIG. 2A, in accordance with an embodiment of the present specification. FIG. 2C is a perspective view showing male and female grinder components of the pill crusher device shown in FIG. 2A. Referring to FIGS. 2A-2C, device 200 comprises a substantially cylindrical male grinder component 202, having a proximal end 201 and a convex distal end 203. The proximal end 201 comprises a plurality of grooves 211 for providing a user with a better grip while using the device 200. The distal end 203 comprises serrated edges 213 for aiding in crushing of pills. FIG. 2D is a perspective view illustration of the male grinder component of the device shown in FIG. 2A. In various embodiments, serrated edges comprise a plurality of teeth having differing number, depth, shape, and orientation such as described with reference to FIG. 1D-1J above. In an embodiment, said serrated edge 213 of device 200 comprises teeth ranging in number from 1 to 100, having various shapes as described with respect to FIGS. 1D-1J, wherein the teeth have a depth ranging from 0.5 mm to 10 mm when measured from tip to base, permitting a clockwise, a counterclockwise or a bidirectional rotation of the male grinder component with respect to the female grinder component. The plurality of teeth aid in reducing an effort required for grinding/crushing pills placed in the female grinder component and make the device easy and convenient to use.

Figure 2E:
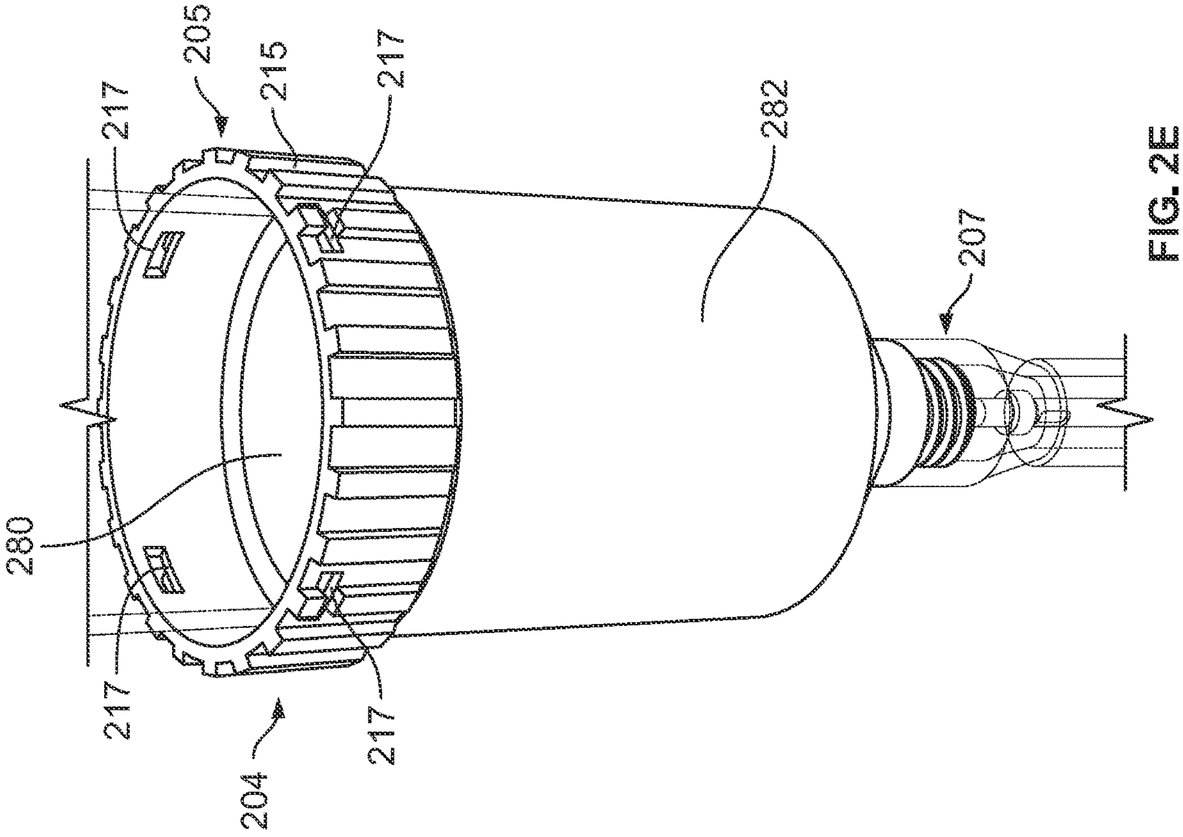
FIG. 2E is a perspective view illustration of the female grinder component of the device shown in FIG. 2A.
Figure 2D:
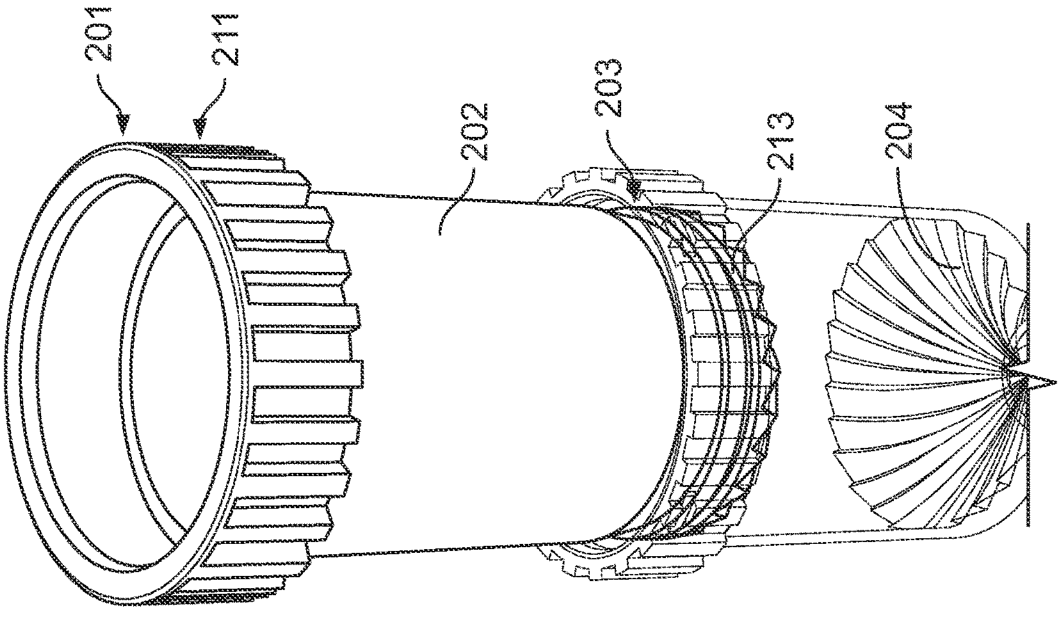
FIG. 2D is a perspective view illustration of the male grinder component of the device shown in FIG. 2A.
Figure 2G:
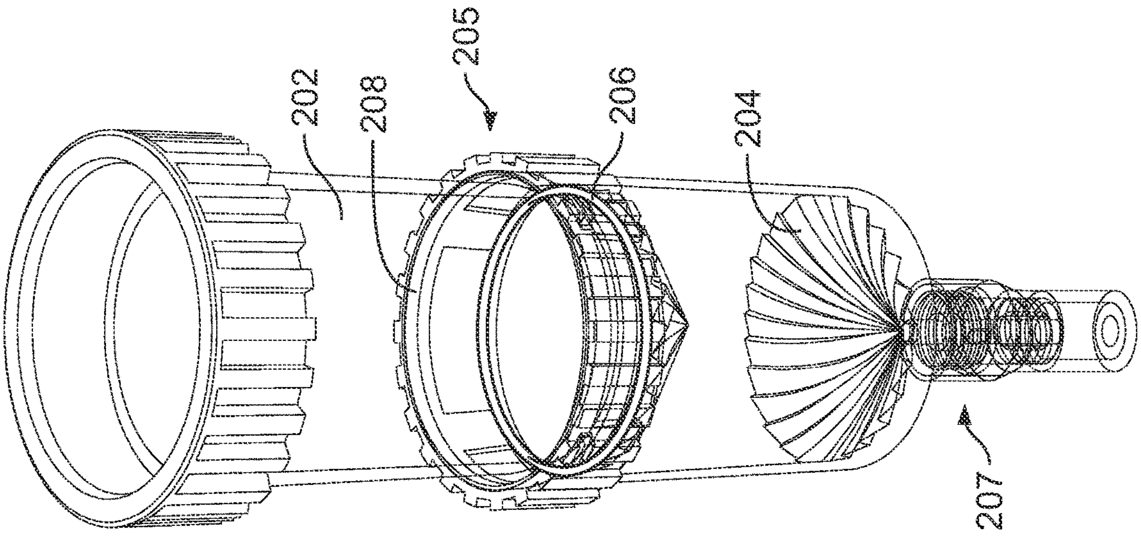
FIG. 2G is a perspective view of a sealing member placed between the male and female grinder components of the device shown in FIG. 2A.
Figure 2F:
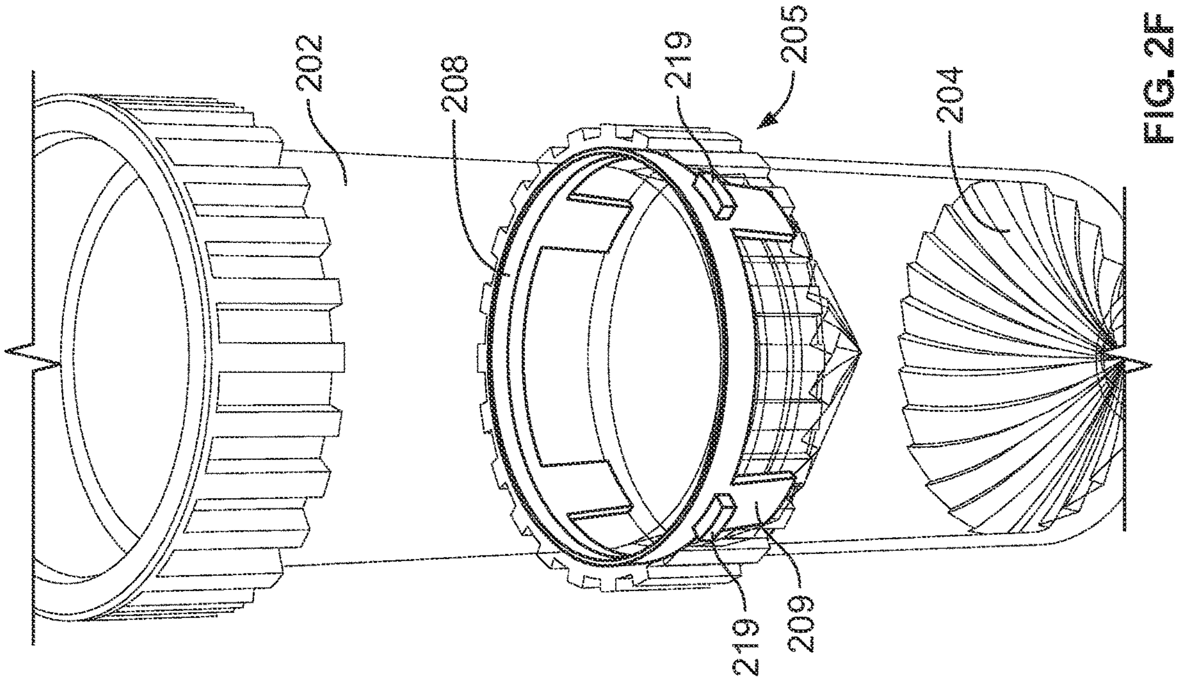
FIG. 2F is a perspective view illustration of a retainer placed between the male and female grinder components of the device shown in FIG. 2A.
Figure 2I:
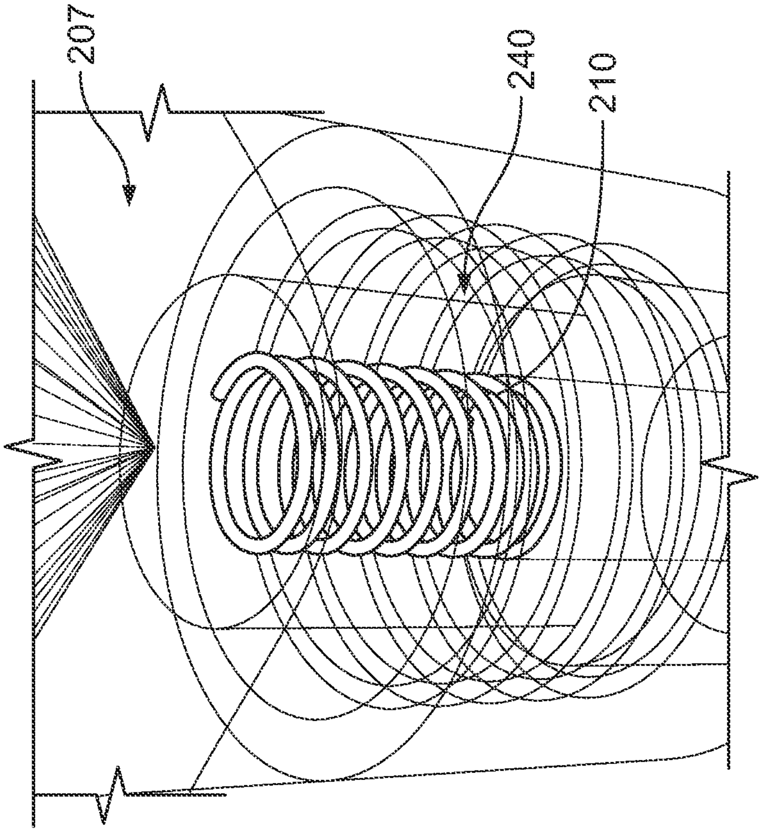
FIG. 2I is a perspective view of a spring placed within a distal end of the female grinder component of the device shown in FIG. 2A.
Figure 2H:
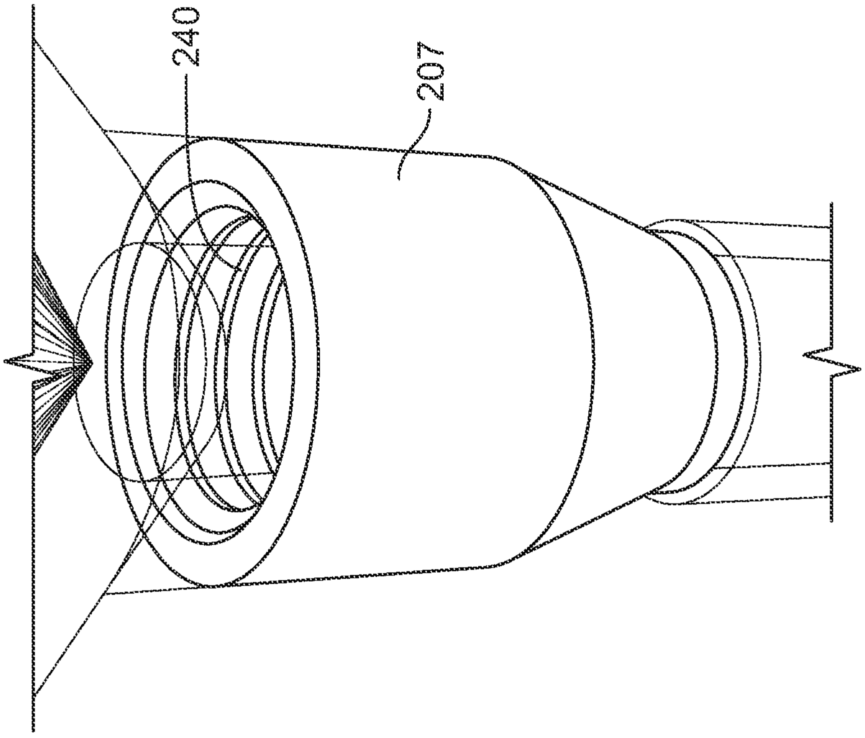
FIG. 2H is a perspective illustration of a distal end of a funnel-shaped female grinder component of the device shown in FIG. 2A.
Figure 2K:
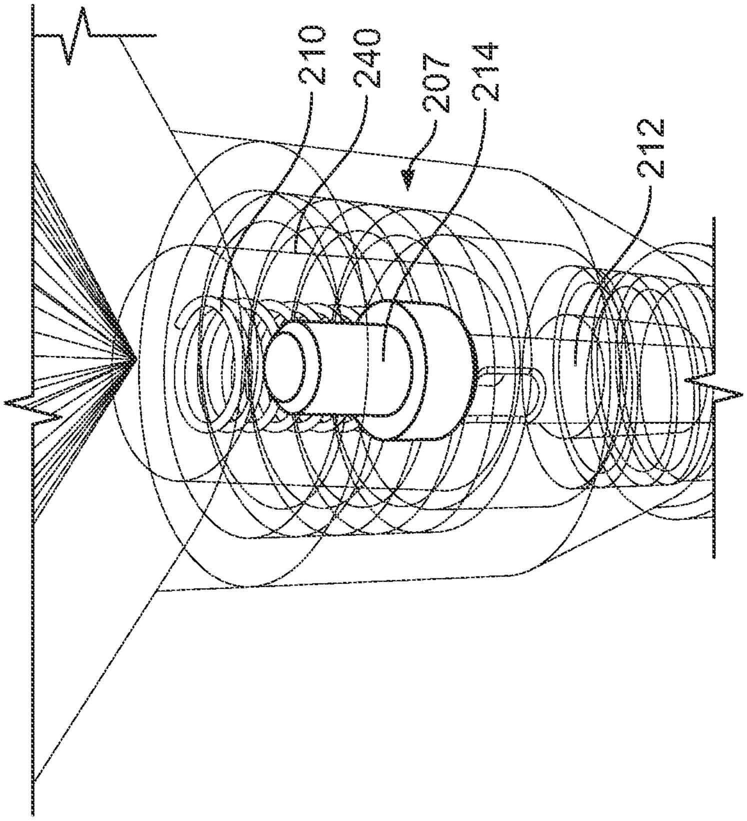
FIG. 2K is a perspective view of a stopper positioned at a proximal end of the valve shown in FIG. 2J such that the valve can be coupled with the spring shown in FIG. 2I.
Figure 2J:
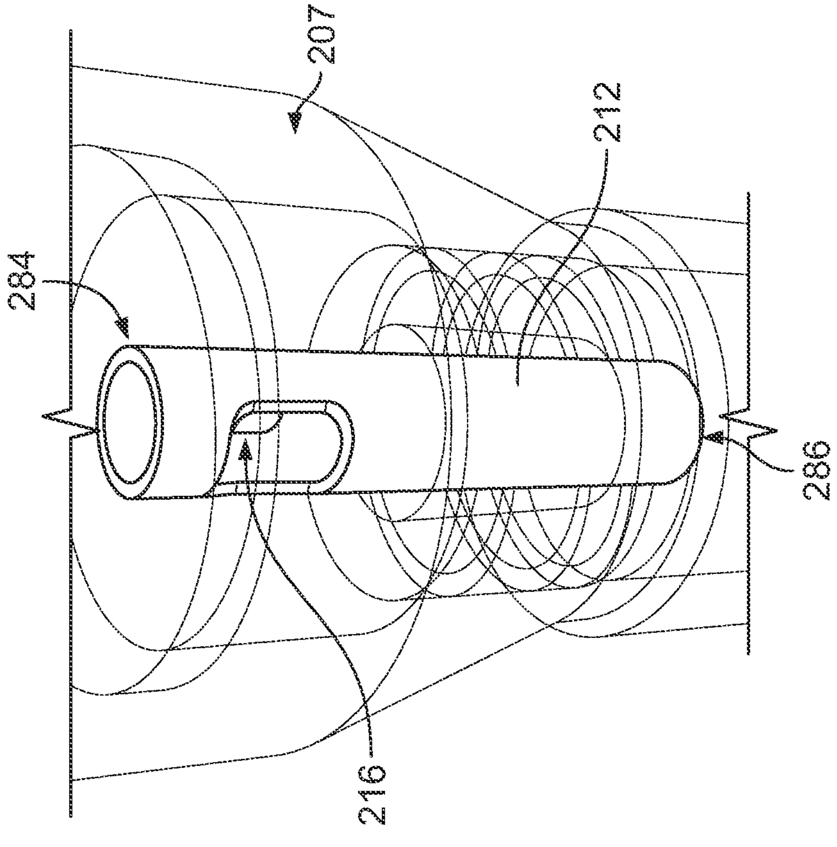
FIG. 2J is a perspective, internal view of a valve coupled with the spring shown in FIG. 2I.
Figure 2M:
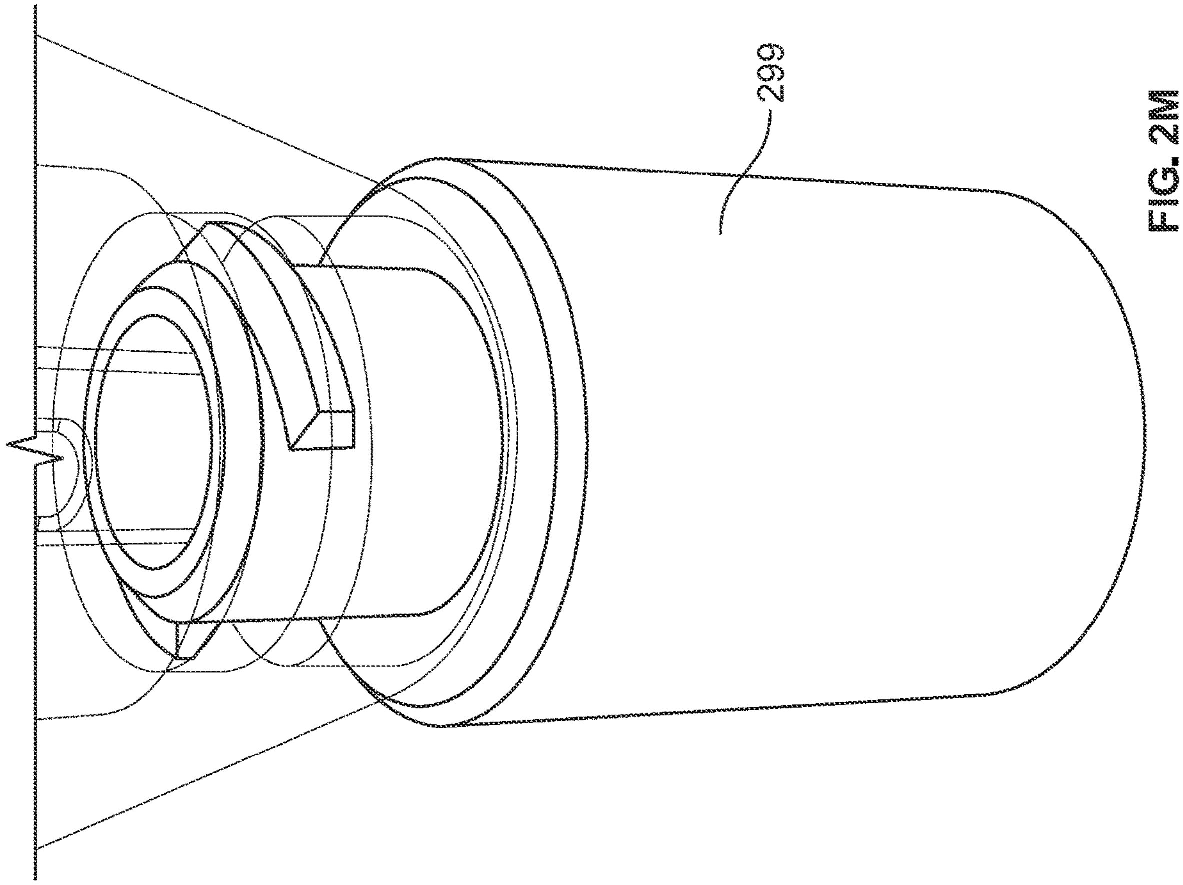
FIG. 2M is a perspective view of an adapter fitted at a bottom of a cap affixed to a distal end of the female grinder component of the device shown in FIG. 2A.
Figure 2L:
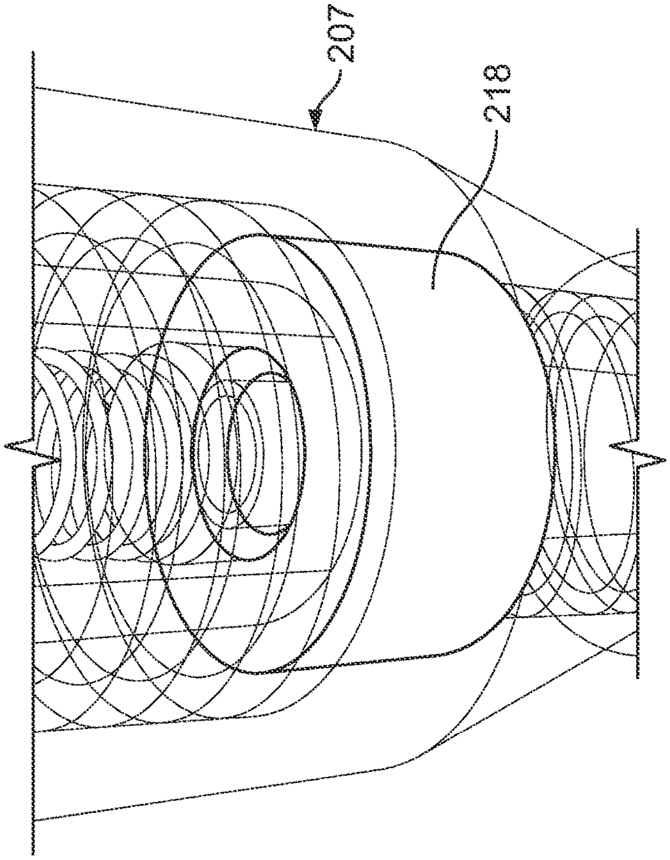
FIG. 2L is a perspective view of a filter enveloping the side openings of the valve shown in FIG. 2J.
Figure 2N:
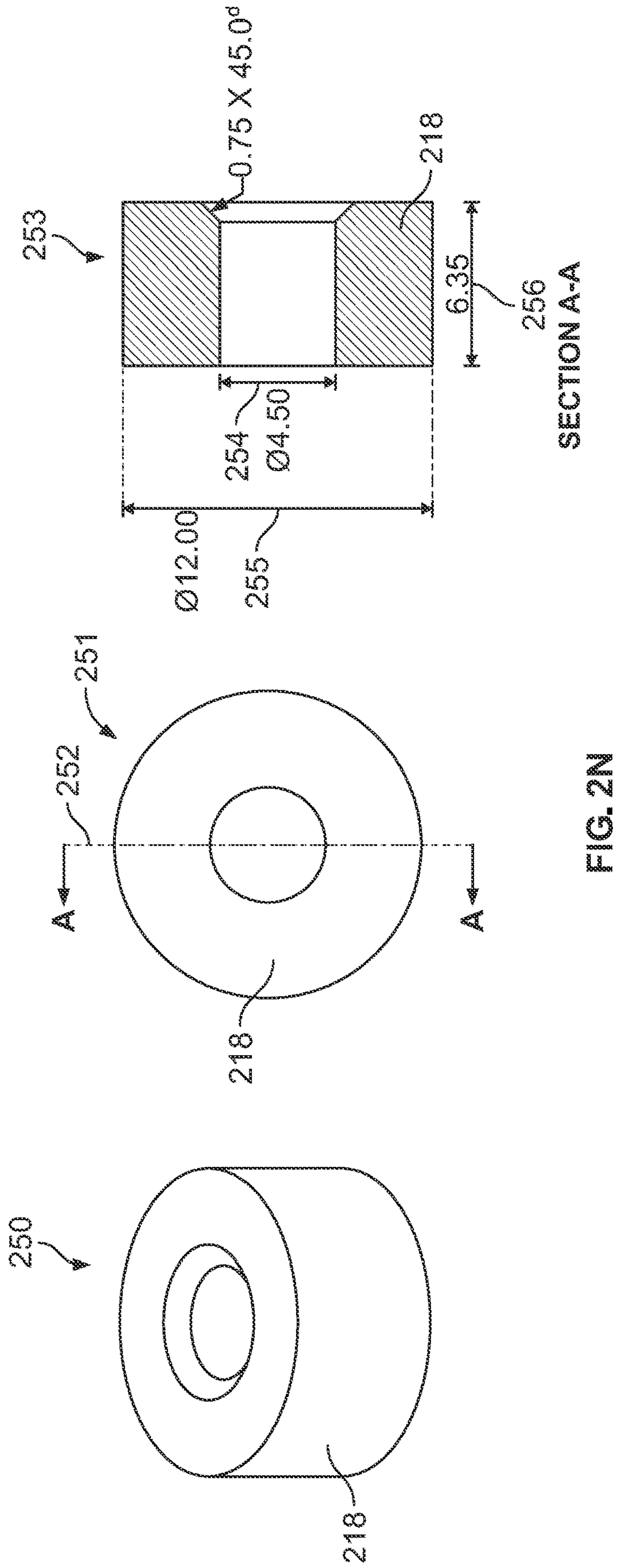
FIG. 2N is a perspective view, a top plan view, and a cross-sectional view of the filter shown in FIG. 2L, in accordance with an embodiment of the present specification.
Figure 2P:
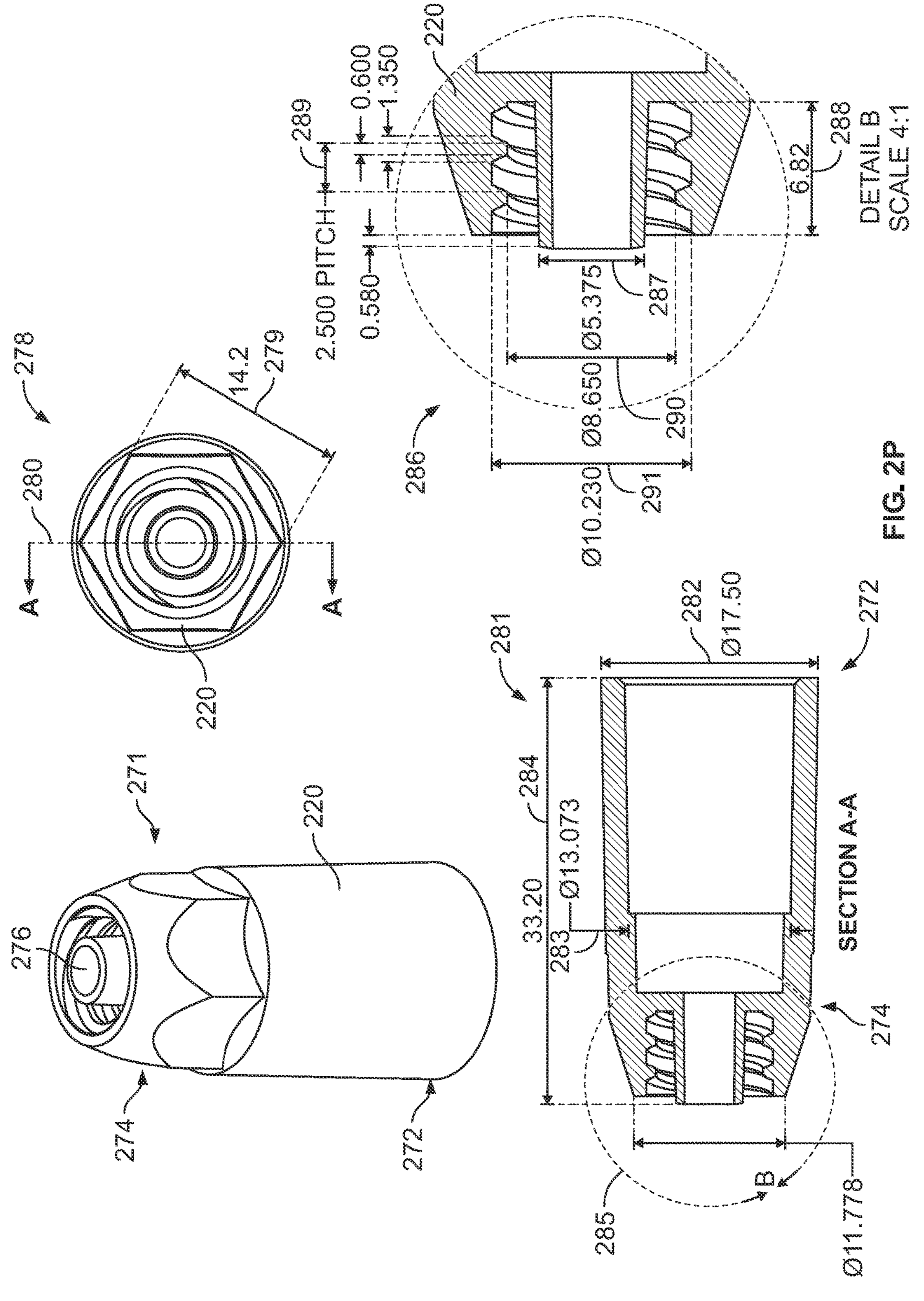
FIG. 2P shows a perspective view, a top plan view, a cross-sectional view, and an exploded cross-sectional view of the adapter shown in FIG. 2M, in accordance with an embodiment of the present specification.
Figure 2Q:
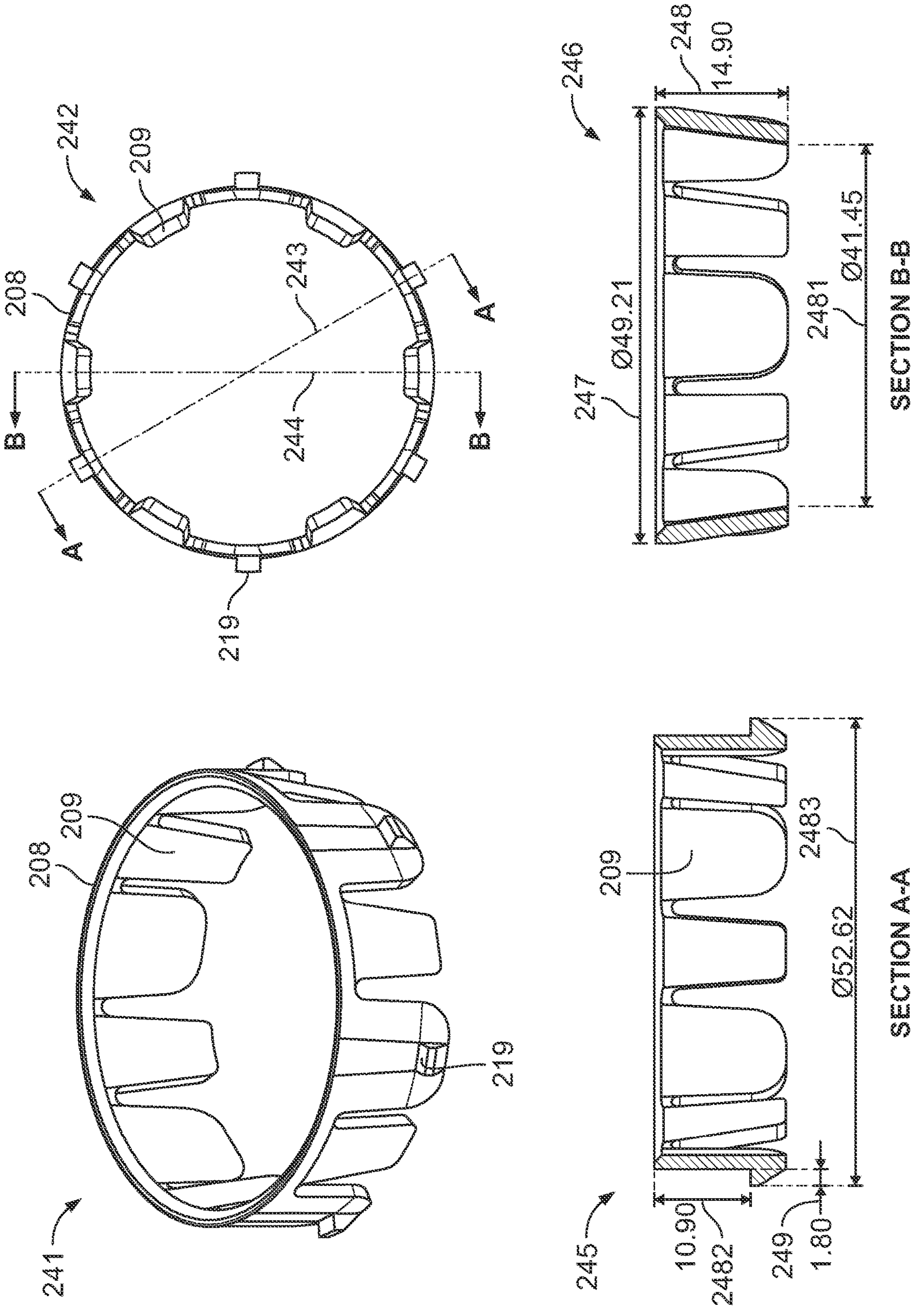
FIG. 2Q shows a perspective view, a bottom plan view, and cross-sectional views of the retainer shown in FIG. 2F, in accordance with an embodiment of the present specification.
Figure 2R:
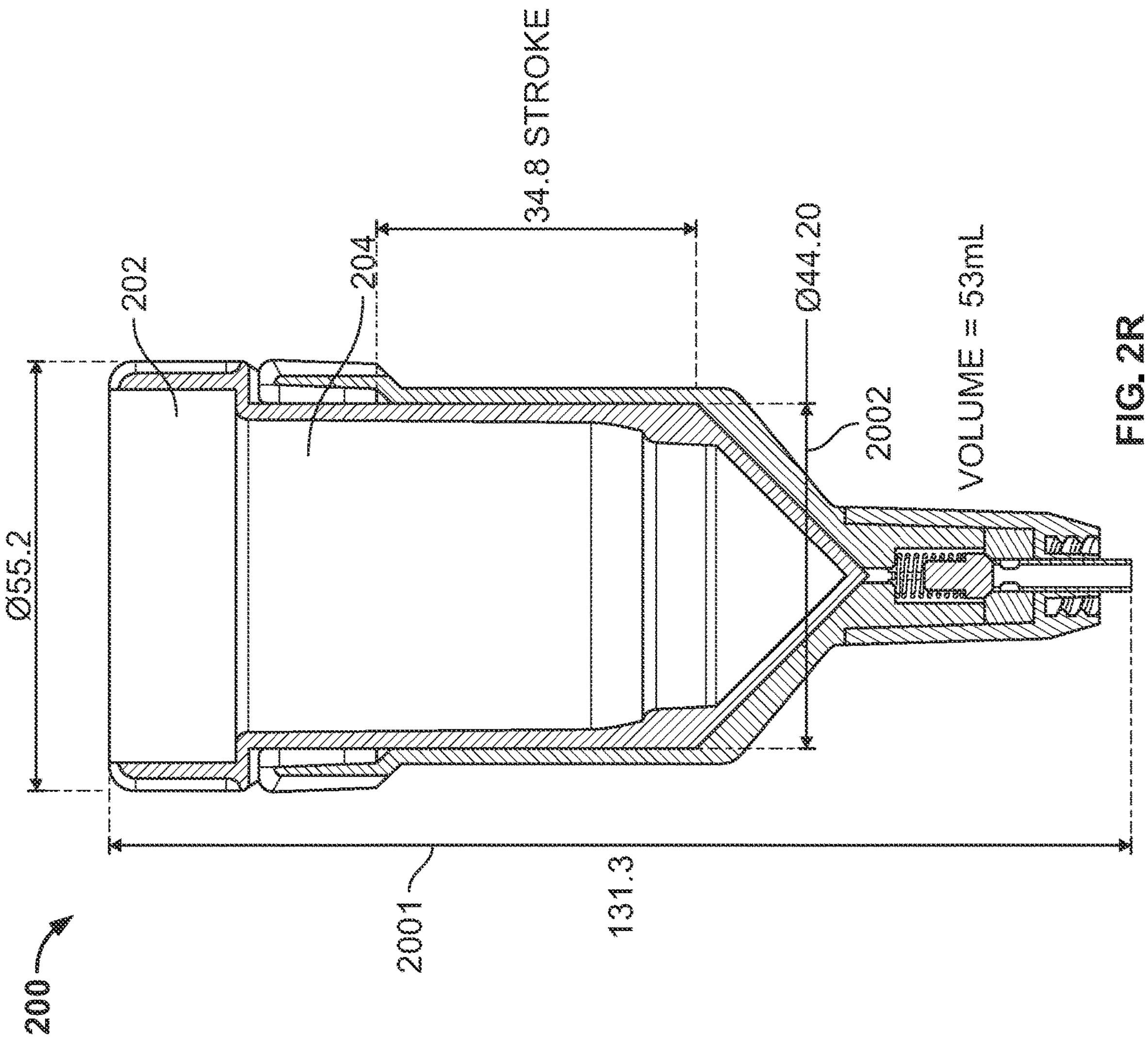
FIG. 2R is a cross-sectional view of the device shown in FIGS. 2A, 2B and 2C, in accordance with an embodiment of the present specification.
Figure 2S:
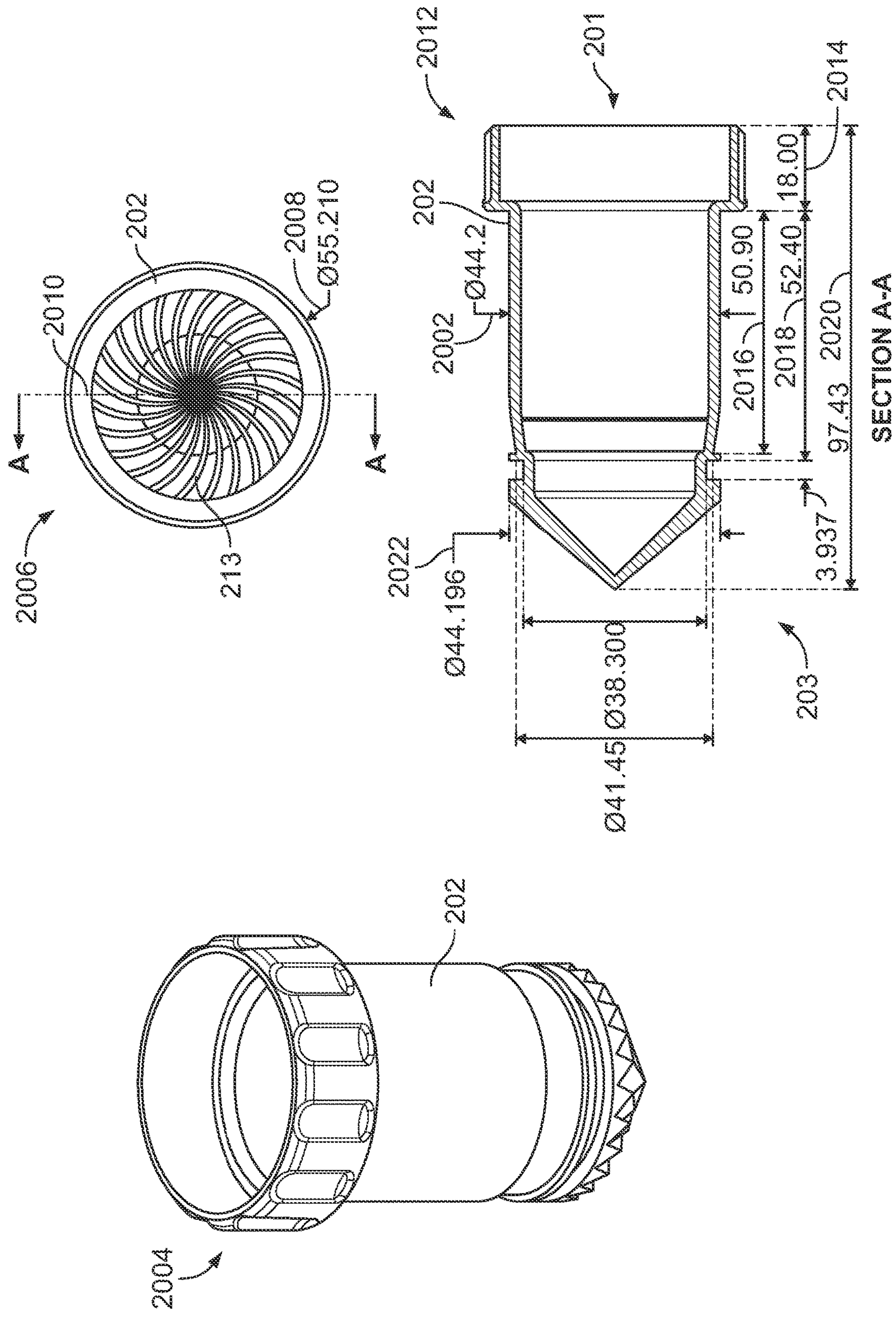
FIG. 2S shows a perspective view, a bottom plan view, and a cross-sectional view of the male grinder component shown in FIG. 2D, in accordance with an embodiment of the present specification.

FIG. 2S illustrates multiple views of the male grinder component shown in FIG. 2D, in accordance with an embodiment of the present specification. FIG. 2S includes a perspective view 2004 of male grinder component 202. A top view 2006 of male grinder component 202 illustrates that component 202 has an outer diameter 2008 of 55.210 mm and a circular cross section, which, when sliced through a sectional line 2010, provides a sectional view 2012. View 2012 shows a portion near the proximal end 201 having a length 2014 of 18.00 mm, a length 2016 of a first mid-portion as 50.90 mm, and a length 2018 of a second mid-portion proximate the distal end 203 as 52.40 mm. In embodiments, male grinder component has a total length 2020 of 97.43 mm and a total diameter 2022 of the distal end 203 of 44.196 mm. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

Device 200 further comprises a cylindrical or syringe-shaped female grinder component 204 having an inner surface 280 and an outer surface 282. During operation, the male grinder component 202 is received by the inner surface/chamber 280 of the female grinder component 204. In an embodiment, the entire length of the male grinder component 202, with the exception of the grooves 211 at the proximal end 201, is inserted into the female grinder component 204 for forming an enclosed grinding/crushing chamber within the female grinder component 204 and crushing one or more pills placed within the crushing chamber. In an embodiment, a distal end 207 of the inner surface/chamber 280 of the female grinder component 204 also comprises serrated edges for aiding in crushing of pills. Once the pills placed inside the female grinder component 204 are completely crushed, the serrated edges 213 of the male grinder component 202 and the serrated edges provided on the inner surface/chamber 280 are completely mated. In an embodiment, when the male grinder component 202 is inserted completely into the female grinder component 204, a small length of the male grinder component 202 remains protruding above the female grinder component 204 for preventing a user's fingers from getting hurt/pinched while rotating the male grinder component 202 with respect to the female grinder component 204. In an embodiment, said small length of the male grinder component 202 that remains protruding above the female grinder component 204 ranges from 0.05 inches to 0.2 inches, and in an embodiment, is approximately 0.1 inches.

FIG. 2E is a perspective view illustration of the female grinder component of the device shown in FIG. 2A. Referring to FIGS. 2A-2E, the female grinder component 204 comprises a proximal end 205 having a grooved edge 215 to aid a user's grip while rotating the male grinder component 202 with respect to the female grinder component 204 for crushing pills placed within the chamber of female grinder component 204.

To aid in the grinding of solid medication, the male grinder component 202 is rotated such that it is pushed up and into the female grinder component 204 until the solid medication is completely crushed and the serrated edges 213 of the male grinder component 202 and the serrated edges provided in the inner surface/chamber 280 of the female grinder component 204 are completely mated. However, in order to prevent the male grinder component 202 from accidently falling out of the female grinder component 204 during the grinding/crushing process (which would release the medication powder to the atmosphere), the device 200 further comprises a retainer or retaining ring 208 and a sealing member positioned between the male grinder component 202 and the female grinder component 204 configured to both enable the male grinder component 202 to fit into the female grinder component 204 and seal the crushing chamber from the atmosphere, effectively creating an approximate hermetic seal. In embodiments, the sealing member, may be an O-ring, an X-ring, a wing tip or any similar structure of any other shape that provides a sealing mechanism for achieving the objectives of the present specification.

FIG. 2F is a perspective view illustrating a retainer 208 placed between the male and female grinder components of the device shown in FIG. 2A. FIG. 2G is a perspective view of a sealing member 206 placed between the male and female grinder components of the device shown in FIG. 2A. Referring to FIGS. 2A-2G, in embodiments, the retainer 208 is integrated into the male grinder component 202 and is configured to provide a locking mechanism between the male and female grinder components 202, 204. In embodiments, retainer 208 is a retaining ring. In an embodiment, the mouth/opening at proximal end 205 of the female grinder component 204 is configured with a plurality of slots/openings 217 to accommodate protruding parts 219 of retainer 208 for enabling the retainer 208 to fit snugly around the mouth or proximal end 205 of the female grinder component 204. In an embodiment, the proximal end 205 comprises at least one slot 217 (FIG. 2E), and preferably four slots 217 into which four protruding parts 219 (FIG. 2F) of the retainer are inserted for fitting the retainer 208 around the proximal end 205 (FIG. 2A, 2F) of the female grinder component 204. The retainer 208 comprises at least one and up to an equal number of corresponding retaining tabs 209 (shown in FIG. 2F). Once the male grinder component 202 is fitted onto and pushed into, the female grinder component 204, the retainer 208 automatically engages the corresponding retaining tabs into the slots on the female portion, thereby preventing separation of the components during operation of the device 200. The retainer 208 allows rotational and vertical/up-down movement of the male grinder component 202 with respect to the female grinder component 204 but prevents separation or extraction of the male grinder component 202 from the female grinder component 204 during operation of the device 200, thereby enabling a sealed, closed system from which no pill particles can escape to the environment outside. In an embodiment the device 200 is a disposable/single use device, wherein once the retainer 208 is fitted around the proximal end 205 of female component 204, it is not removable. In an embodiment, device 200 is a disposable/single use device which is provided in a sterilized packaging and does not require sterilization before use.

In another embodiment, device 200 is provided as a reusable device which may need to be sterilized by a user prior to each use. In a reusable embodiment of device 200, retainer 208 is not provided, and the male grinder component 202 and the female grinder component 204 are held together by the user during operation of the device. Further, device 200 includes a filter 218 (described below) which may be required to be replaced/cleaned after a predefined number of uses of the device.

FIG. 2Q illustrates multiple views of the retainer 208 shown in FIG. 2F, in accordance with an embodiment of the present specification. A perspective view 241 illustrates a retainer 208 comprising at least one and up to an equal number of corresponding retaining tabs 209 and at least four protruding members 219 as described with reference to FIG. 2F above. A top view 242 shows that retainer 208 has a circular cross section, which when sliced through a sectional line 243 provides a cross-sectional view 245 and when sliced through a sectional line 244 provides a cross-sectional view 246. The cross-sectional views 245, 246 illustrate an outer diameter 247 of the retainer 208 as 49.21 mm; a length 248 of each of the plurality of retainer tabs 209 of 14.90 mm; an inner diameter 2481 of the retainer 208, formed by the free ends of the retainer tabs 209, of 41.45 mm; a distance 249, through which the protruding members 219 extend away from the retainer 208, of 1.80 mm; a length 2482 of the tabs 209, subtracting a length of the protruding member 219, of 10.90 mm; and a diameter 2483 of the retainer 208 along with the distance through which the protruding parts 219 extend away from the retainer 208 of 52.62 mm. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

In embodiments, a portion of the inner surface 280 of the female grinder component 204 that is located at a distal end 207 of the female grinder component 204 is configured to receive or be coupled with a spring 210 which, in turn, is configured to receive or be coupled with a valve 212. FIG. 2H is a perspective illustration of a distal end of a funnel-shaped female grinder component of the device shown in FIG. 2A. FIG. 2I is a perspective view of a spring 210 placed within a distal end 207 of the female grinder component of the device shown in FIG. 2A. FIG. 2J is a perspective, internal view of a valve coupled with the spring shown in FIG. 2I. Valve 212 has a proximal end 284 and a distal end 286. FIG. 2K is a perspective view of a stopper positioned at a proximal end 284 of the valve 212 shown in FIG. 2J such that the valve can be coupled or mated with the spring shown in FIG. 2I. FIG. 2K is a perspective view of a stopper member 214 coupled to the proximal end 284 of the valve 212 for coupling with the spring 210 shown in FIG. 2J.

Referring to FIGS. 2A-2K, a portion 240 of the inner surface 280 of the female grinder component 204 that is located at the distal end 207 of the female grinder component 204 and is configured for receiving/coupling with a spring 210 is cylindrical in shape and is sized/designed such that the spring 210 fits snugly therein. Valve 212 is a hollow, elongated member comprising a stopper member 214 coupled to the proximal end 280, wherein the stopper member 214 fits into the spring 210 forming a sealed contact, as shown in FIG. 2J. Valve 212 further comprises a pair of side openings 216, enveloped in a filter 218 which prevents liquid or solid particles from flowing out of the side openings 216. FIG. 2L is a perspective view of a filter 218 enveloping the side openings 216 of the valve 212 shown in FIG. 2J. In embodiments, the air travels through the filter 218 before leaving through the valve 212, allowing for air to move in and out of the device 200 while pills are being crushed in the device. In an embodiment, the filter 218 is a hydrophobic filter which allows only air to pass through, preventing liquid or solid particles from flowing in or out of the side openings 216. In embodiments, filter 218 also prevents foreign items from entering the device 200 from the outside. In an embodiment, the filter 218 is a porous polymer filter, however, in other embodiments, a variety of suitable materials may be used for filter 218. In an embodiment, filter 218 is a polyethylene filter. In embodiments, the filter is fabricated using a porous polymer, having a porosity ranging from 5 microns to 60 microns.

FIG. 2N illustrates multiple views of the filter shown in FIG. 2L, in accordance with an embodiment of the present specification. As can be seen in a perspective view 250 and top view 251, filter 218 is shaped as a ring and is configured to surround side openings 216 of the valve 212 shown in FIG. 2J. The circular top view 251 is sliced along a sectional line 252 to obtain a cross-sectional view 253 of the filter 218. In an embodiment, filter 218 has an inner diameter 254 of 4.4 mm and an outer diameter 255 of 12 mm. In an embodiment, a thickness 256 of the ring-shaped filter 218 is approximately 6.35 mm.

In an embodiment, the spring 210 is a corrosion resistant compression spring. FIG. 2O is a table illustrating exemplary parameters of a spring that may be used in the device of the present specification. As shown in table 270, in embodiments, the compression spring 210 has a length of 14 mm, an outer diameter of 5.5 mm, an internal diameter of 4.5 mm, and a spring rate of 0.18 lbs/mm. In embodiments, the spring may be plastic, metal, stainless steel, or silicon or any other corrosion resistant material. In an embodiment, the spring 210 is easily compressible as it has a low spring rate of 0.18 lbs/mm, wherein the spring rate is the amount of force required for every millimeter of compression. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

In an embodiment, an adapter 299 is provided to be fitted at a bottom of the cap 220. In an embodiment, the adapter 299 may be the tip of a syringe attached to the distal end 207 of cap 220. In an embodiment, the adapter 299 may be shaped like a cap that may be fitted or screwed into a distal end or bottom of cap 220. FIG. 2M is a perspective view of the adapter 299 which may be fitted onto the bottom of the cap 220 shown in FIG. 2B. In an embodiment, the adapter 299 is a syringe adapter for receiving a syringe (not shown). In embodiments, any size and type of syringe may be used with the device 200. In embodiments, once the adapter/cap/tip 299 is attached to the distal end of cap 220, the valve 212 is opened, thereby allowing water/fluid to flow up the device 200.

FIG. 2P shows multiple views of the cap 220 shown in FIG. 2B, in accordance with an embodiment of the present specification. A perspective view 271 of the cap 220 shows a distal end 272 for coupling with a bottom of the distal end 207 of the female grinder component 204 and a proximal end 274 comprising a nozzle 276 for receiving an Enfit syringe (not shown), wherein the distal end 272 is wider than the proximal end 274. A top view 278 of the cap 220 illustrates that, in an embodiment, a length of a section 279 of the cap 220 is 14.2 mm. The top view 278 corresponding to the perspective view 271 shows that the cap 220 has a circular cross section, which when sliced through a sectional line 280 provides a cross-sectional view 281. In an embodiment, a diameter 282 of the distal end 272 is 17.50 mm and a diameter 283 of the proximal end 274 13.073 mm, while a length 284 of the cap 220 is 33.20 mm. Portion 285 of cross-sectional view 281 is shown in exploded cross-sectional view 286, illustrating a diameter 287 of the nozzle 276 as 5.375 mm. In an embodiment, the nozzle 276 is surrounded with a threaded portion having a length 288 of 6.82 mm and a pitch 289 of 2.500 mm for connecting with an Enfit syringe (not shown). The threaded portion comprises smaller threads wherein a diameter 290 of the nozzle 276 along with the smaller threads is 8.65 mm; alternating with larger threads wherein a diameter 291 of the nozzle 276 along with the larger threads is 10.230 mm.

In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

FIG. 2R is a cross-sectional view of device 200 shown in FIGS. 2A, 2B and 2C, in accordance with an embodiment of the present specification. As shown, in an embodiment, a total length 2001 of device 200 is 131.3 mm, an internal volume is 53 ml and internal diameter 2002 is 44.20 mm. As shown in FIG. 2R, device 200 has a stroke of 34.8, which represents the maximum distance that the male grinder component and female grinder component may separate from each other, or the slide distance, which then yields the internal volume of the female grinder component, or the device 200. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

Figure 2T:
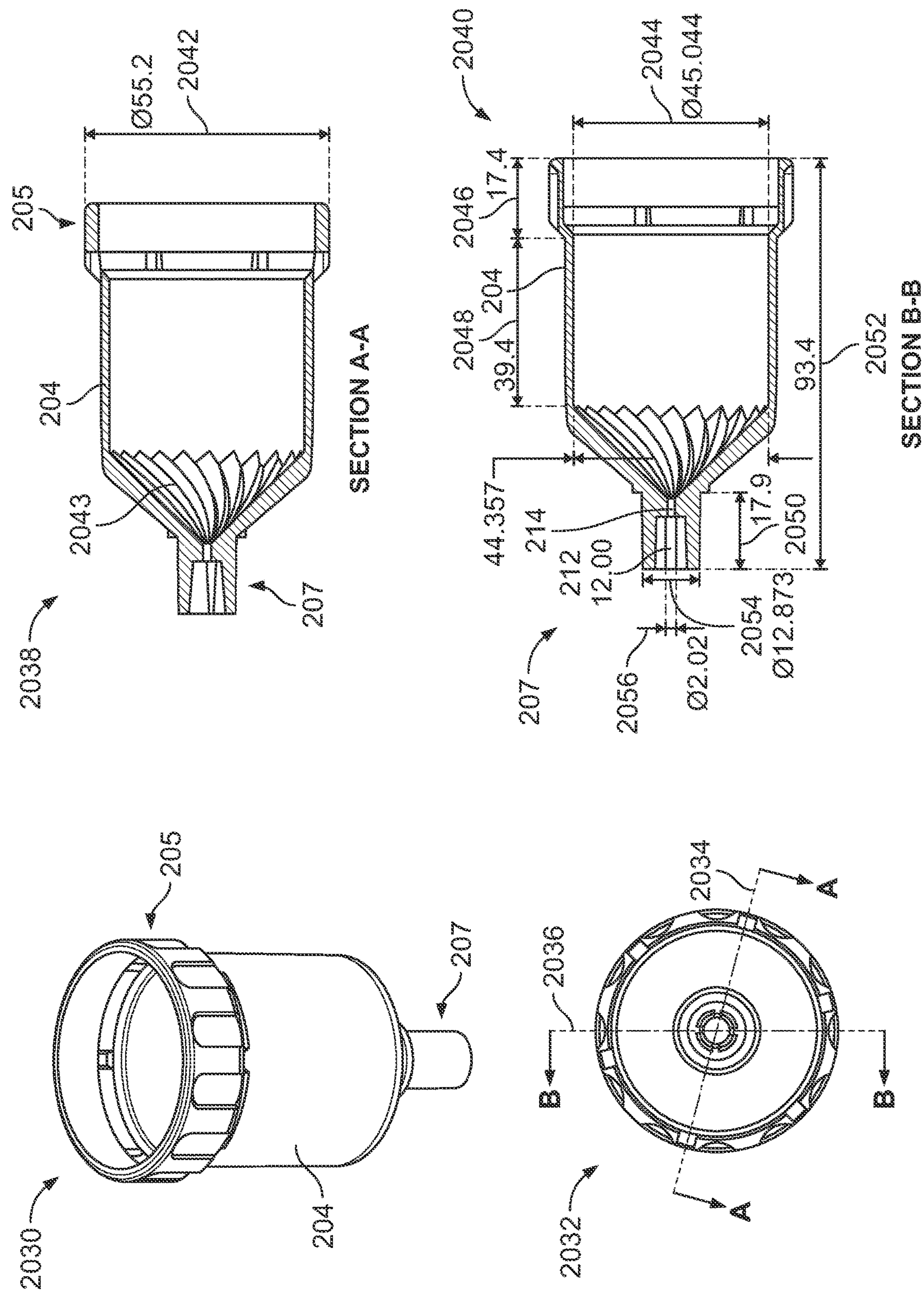
FIG. 2T shows a perspective view, a top plan view, and cross-sectional views of the female grinder component shown in FIG. 2E, in accordance with an embodiment of the present specification.

FIG. 2T illustrates multiple views of the female grinder component shown in FIG. 2E, in accordance with an embodiment of the present specification. FIG. 2T includes a perspective view 2030 of female grinder component 202 having a proximal end 205 and a distal end 207. A top view 2032 of female grinder component 202 shows that the component 204 has a circular cross section, which when sliced through a sectional line 2034, provides a cross-sectional view 2038 and when sliced through a sectional line 2036, provides a cross-sectional view 2040. View 2038 shows an inner surface at the distal end 207 comprising serrated edges 2043 for aiding in crushing of pills. Further, an external diameter 2042 of the proximal end 205 is 55.2 mm, in an embodiment. View 2040 illustrates that the internal diameter 2044 of female grinder component 204 near the proximal end 205 (which is configured to receive the male grinder component) is 45.044 mm; a length 2046 of a proximal portion of the component 204 is 17.4 mm; a length 2048 of a middle portion of the component 204 is 39.4 mm; a length 2050 of a distal portion of the component 204 is 17.9 mm and a total length 2052 of the component 204 is 93.4 mm. The view 2040 also shows that, in an embodiment, an external diameter 2054 of the distal end 207 is 12.873 mm, while a diameter 2056 of the valve 212 coupled with the distal end 207 is 2.02 mm. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

Figure 3A:
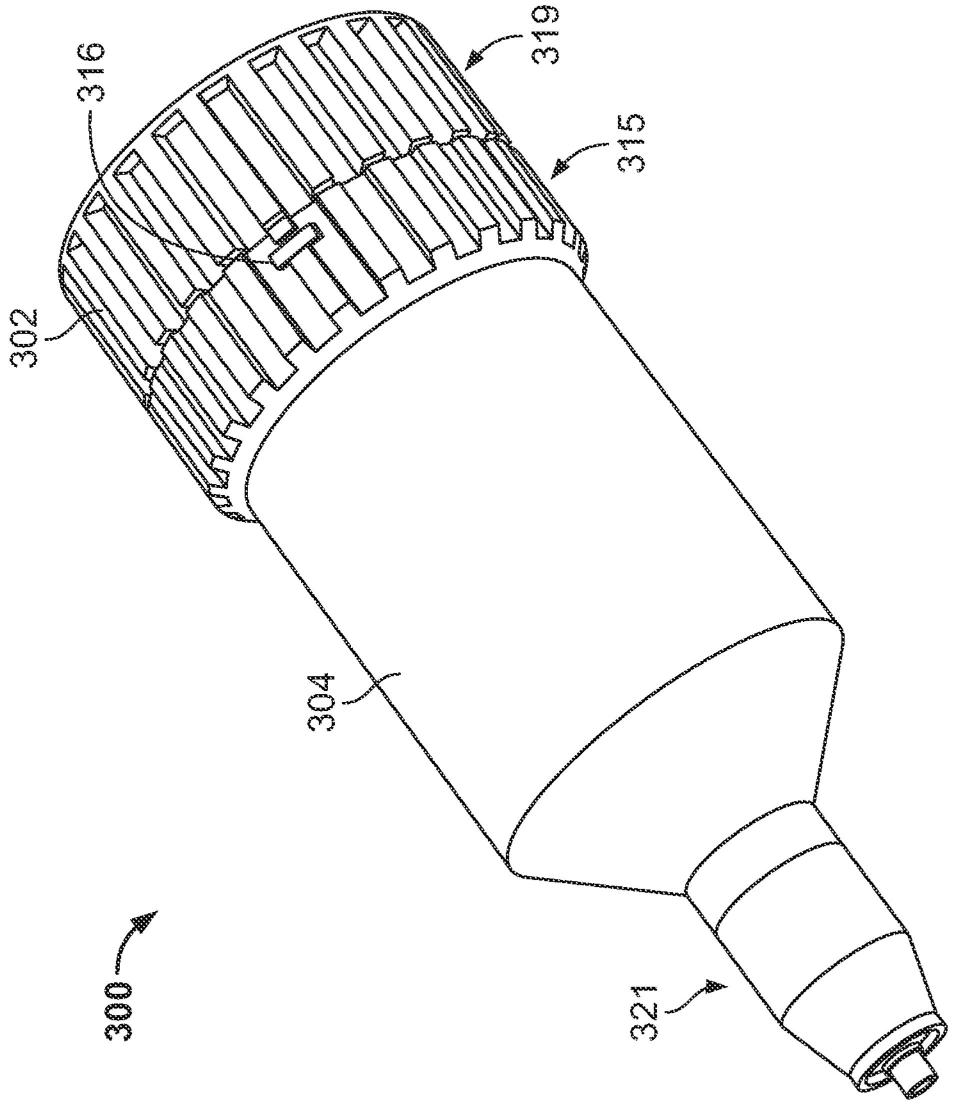
FIG. 3A is a perspective view of a pill crusher device, in accordance with an embodiment of the present specification.
Figures 3B, 3C, 3D:
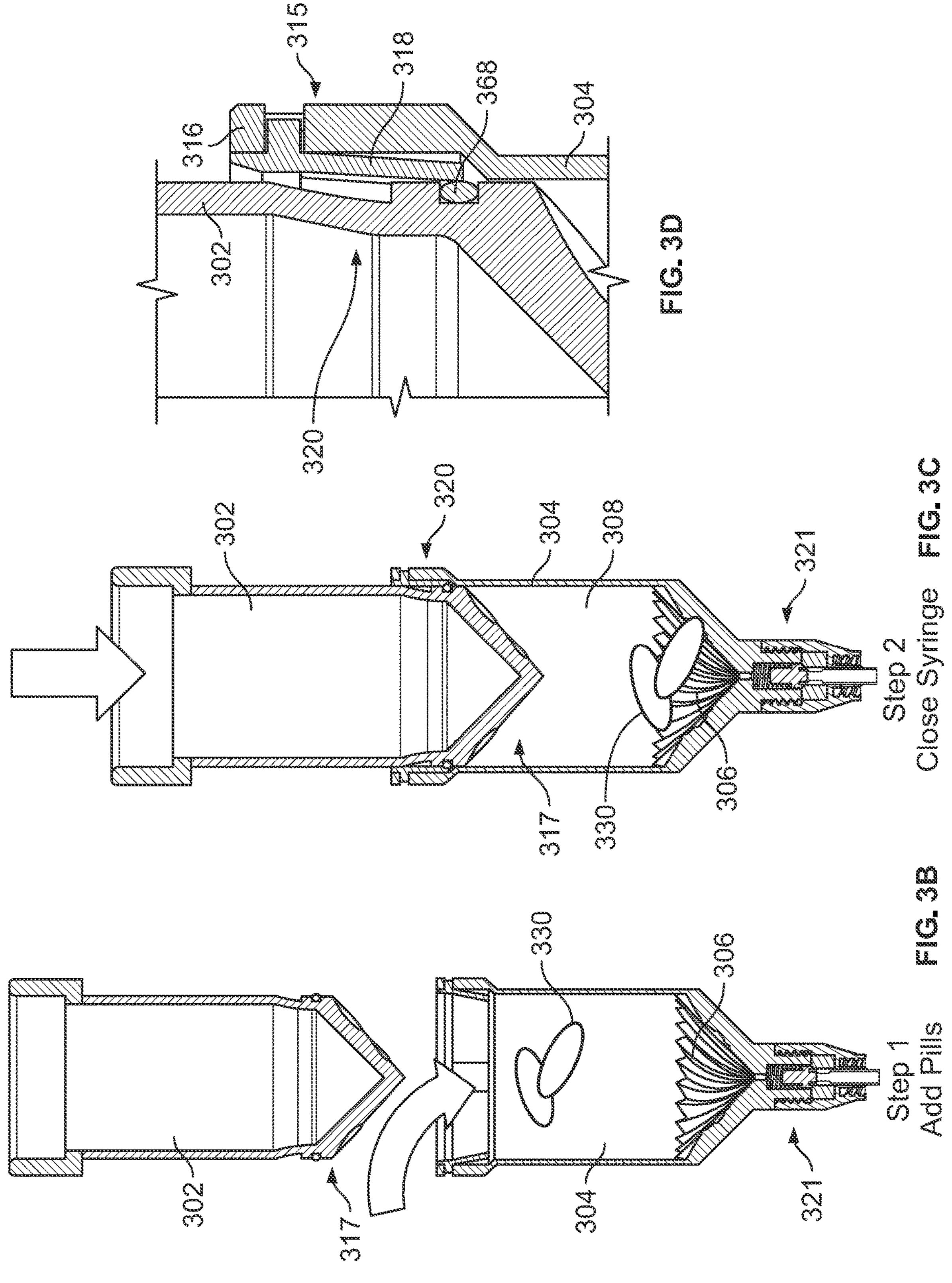
FIG. 3B is a side plan view illustration showing pills placed inside the pill crusher device shown in FIG. 3A.
FIG. 3C is a side plan view illustration showing a male grinder component connected to a female grinder component forming an enclosed crushing chamber within the device shown in FIG. 3A.
FIG. 3D is an enlarged sectional view of a region shown in FIG. 3C showing the connection of the male grinder component to the female grinder component.

FIG. 3A is a perspective view of a pill crusher device, in accordance with an embodiment of the present specification. The structure and components of pill crusher device 300 is similar to that described with reference to FIGS. 2A-2M above. Pill crusher device 300 comprises a male grinder component 302 which, during operation of device 300 is at least partially inserted into a female grinder component 304. In an embodiment, the male grinder component 302 is inserted completely into the female grinder component 304, such that a small length of the male grinder component 302 remains protruding above the female grinder component 304 for preventing a user's fingers from getting hurt/pinched while rotating the male grinder component 302 with respect to the female grinder component 304. In an embodiment, said small length of the male grinder component 302 that remains protruding above the female grinder component 304 ranges from 0.05 inches to 0.2 inches, and in an embodiment, is approximately 0.1 inches. FIG. 3B is a side plan view illustrating pills placed inside the female grinder portion 304 of the pill crusher device shown in FIG. 3A. As shown in FIG. 3B pills 330 are placed within the female grinder component 304. In an embodiment, as shown in FIG. 3B, an inside surface of the female grinder component 304 comprises serrated edges 306 for aiding in crushing the pills 330.

In various embodiments, serrated edges comprise a plurality of teeth having differing number, depth, shape, and orientation such as described with reference to FIG. 1D-1J above. In an embodiment, said serrated edge 306 of device 300 comprises teeth ranging in number from 1 to 100, having various shapes as described with respect to FIGS. 1D-1J, wherein the teeth have a depth ranging from 0.5 mm to 10 mm when measured from tip to base, permitting a clockwise, a counterclockwise or a bidirectional rotation of the male grinder component with respect to the female grinder component. The plurality of teeth aid in reducing an effort required for grinding/crushing pills placed in the female grinder component and make the device easy and convenient to use.

FIG. 3C is a side plan view illustration showing a male grinder component mated with a female grinder component, forming an enclosed crushing chamber within the device shown in FIG. 3A. FIG. 3C illustrates the male grinder component 302 connected/fitted on the female grinder component 304 forming an enclosed crushing chamber 308 in the device of FIG. 3A. As described with reference to FIGS. 2A-2M above, the pill crusher device of the present specification comprises a sealing member and a retainer ring. In embodiments, the sealing member may be an O-ring, an X-ring, a wing tip or any similar structure of any other shape that provides a sealing action effectively creating an approximate hermetic seal for achieving the objectives of the present specification. In embodiments, the retainer is integrated into the male grinder component 302 and is configured to provide a locking mechanism between the male and female grinder components 302, 304. In an embodiment, the mouth/opening at proximal end 315 of the female grinder component 304 is configured with a plurality of slots/openings (four slots as shown in FIG. 2E, in an embodiment) to accommodate protruding tabs (four tabs as shown in FIG. 2F) of the retainer for enabling the retainer to fit snugly around the mouth or proximal end 315 of the female grinder component 304. FIG. 3A illustrates a protruding part 316 of the retainer ring fitted within the proximal end 315 of the female grinder component.

FIG. 3D is an exploded sectional view of a region 320 shown in FIG. 3C showing the connection or mating of the male grinder component 302 to the female grinder component 304. The retaining slots are positioned on a mouth/proximal end 315 of the female grinder component 304 such that the retaining tabs, when connected or mated, are bent away from the inner walls of the female grinder component 304. FIGS. 3C and 3D show the protruding component 316 and a retainer tab 318 which flexes towards an inner surface of the proximal end 315 of the female grinder component 304, when a distal end 317 of the male grinder component 302 is inserted into the proximal end 315 of the female grinder component 304, thereby allowing the male grinder component 302 to be inserted within the female grinder component 304 and preventing separation of the components during operation of the device 300.

Figure 3F:
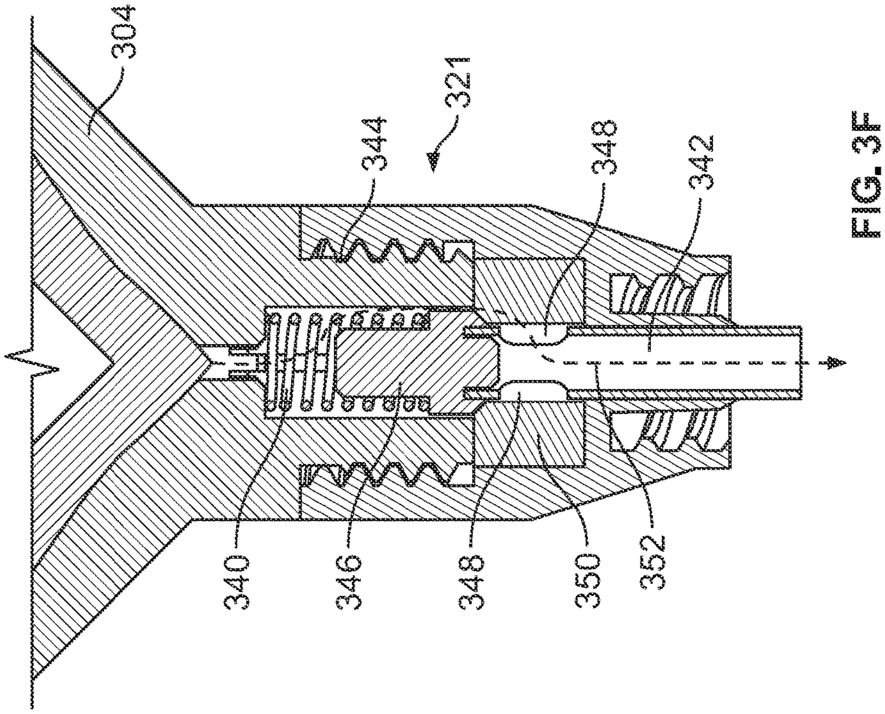
FIG. 3F is a cross-sectional view of a distal end of the female grinder component illustrating a path of compressed air as the device shown in FIG. 3A is being used to crush the pills.
Figure 3E:
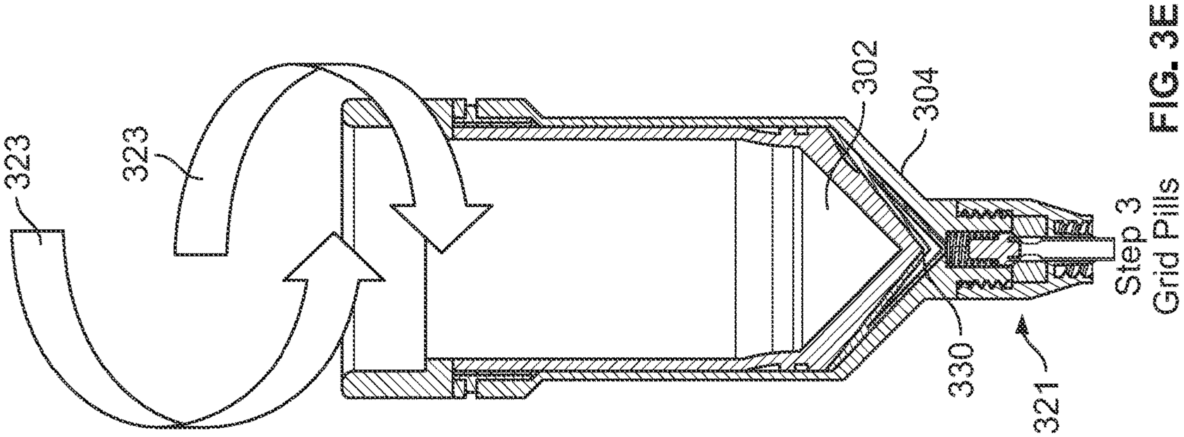
FIG. 3E is a side plan view illustration showing the male grinder component fully inserted within the female grinder component, and a twist movement for crushing the pills.

FIG. 3E is a side plan view illustration showing the male grinder component 302 fully inserted within the female grinder component 304, including a schematic showing a twist or rotational movement for crushing pills 310. In embodiments, the male grinder component 302 is considered to be fully inserted within the female grinder component 304 when a proximal grooved end 319 of the male grinder component 302 sits on top of an abuts the proximal grooved end 315 of the female grinder component 304 as shown in FIG. 3A. In an embodiment, in order to crush the pills 330, the grooved end 315 of the male grinder component 302 is held by a user while rotating the grooved end 319 of the male grinder component 302 as depicted by arrow 323 shown in FIG. 3E.

FIG. 3F is a cross-sectional view of a distal end of the female grinder component of the device shown in FIG. 3A as the device is being used to crush the pills. In embodiments, an inner surface of a distal end 321 of the funnel shaped female grinder component 304 is configured to receive or be coupled with a spring 340 which, in turn, is configured to receive or be coupled with a valve 342. As described above with reference to FIGS. 2A-2M, and further illustrated in FIG. 3F, the inner surface of the distal end 321 of the female grinder component 304 comprises grooves 344 designed such that the spring 340 fits snugly in and is mated with the grooves 344. Valve 342 is a hollow elongated member comprising a stopper member 346 at a proximal end, wherein the stopper member 346 fits into the spring 340 forming a sealed contact, as shown in FIG. 3F. Valve 342 further comprises at least two side openings 348, enveloped in a cylindrical filter 350 which prevents liquid or solid particles from flowing out of the side openings 348. In an embodiment, the filter 350 is a hydrophobic filter which allows only air to pass through, preventing water/liquid or solid particles from flowing in or out of the side openings 348.

When a pill is being crushed in the crushing chamber 308, as shown in FIG. 3E, the stopper member 346 prevents any pill dust from exiting the distal end 321 of the female grinder component 304. The side openings 348 enable maintenance of a pressure differential in the closed grinding chamber of the device 300, by allowing air 352 (shown as a blue dotted arrow in FIG. 3F) to flow out through the chamber while the filter 350 prevents any liquid or solid particles from flowing out of the side openings 348.

Figure 3G:
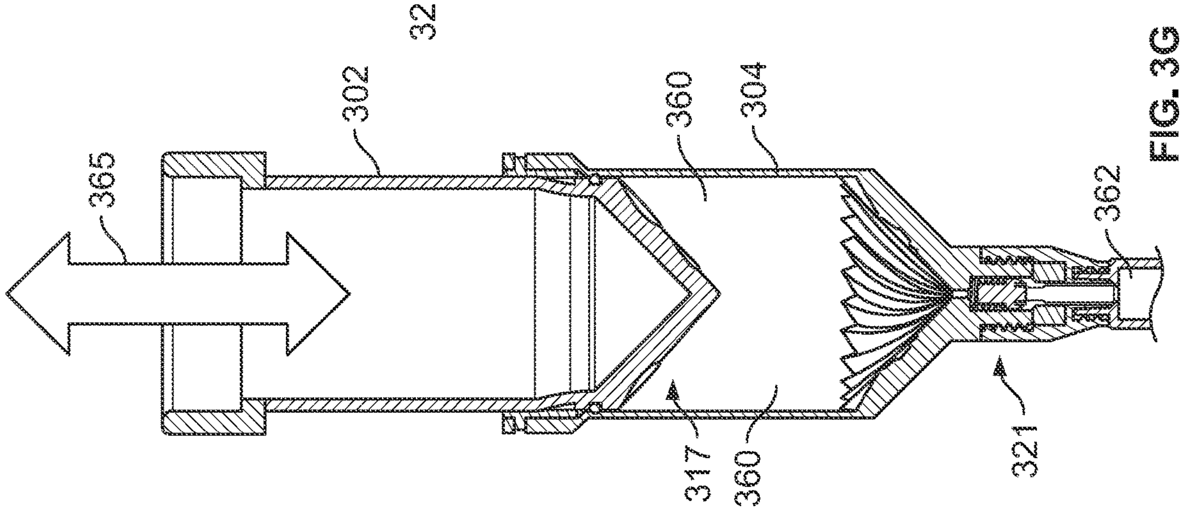
FIG. 3G is a side plan view illustration of the device of FIG. 3E with a syringe adapter attached to the distal end of the female grinder component for mixing the crushed pills with liquid.

FIG. 3G is a side plan view illustration of the device of FIG. 3E with a syringe adapter attached to the distal end of the female grinder component for mixing the crushed pills with water/liquid. FIG. 3G illustrates the device of FIG. 3E with a syringe adapter attached to the distal end 321 of the female grinder component 304 for mixing the crushed pills with water/liquid forming a liquid mixture 360. During operation of the device 300, once one or more pills are completely crushed, a syringe is connected to the distal end 321 of the female grinder component 304 via a syringe adapter 362. In embodiments, the syringe is used for pushing fluid/water via a distal end of the valve 342 up through the hollow length of the valve 342 towards the crushing chamber in the female grinder component 304, which is sealed from above by the distal end 317 of the male grinder component 302. In embodiments, the connection of the syringe to the syringe adapter 362 creates an upwards force pushing the stopper member 346 up through the spring 340 into the crushing chamber within the female grinder component 304. This allows the water/fluid to flow out of the side openings 348 into the crushing chamber and mix with the crushed pills powder forming the liquid mixture 360.

As shown in FIG. 3G, the connection of a syringe to the syringe adapter 362 creates an upwards force causing the liquid mixture 360 to push upwards the distal end 317 of the male grinder component 302, which is demonstrated in FIG. 3G via arrow 365. The plurality of retainer tabs 318 (shown in FIG. 3C) of the retainer ring fitted around the mouth of the female grinder component 304 aid in preventing the male grinder component 302 from separating from the female grinder component 304. Further, a sealing member 368 (shown in FIG. 3C) positioned between the male grinder component 302 and the female grinder component 304, seals the crushing chamber from the atmosphere by preventing the liquid mixture 360 from leaking out of the female grinder component 304, by effectively creating an approximate hermetic seal.

Figure 3H:
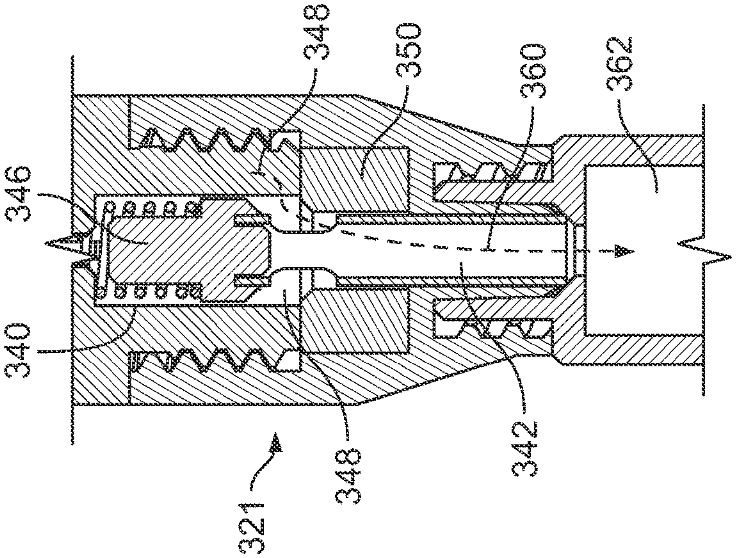
FIG. 3H is a cross-sectional view of the device of FIG. 3G, showing a liquid mixture flowing out from the female grinder portion and into the syringe adapter.

In embodiments, the connection of the syringe to the syringe adapter 362 effectively opens the valve 342, bypassing the filter 350 and allowing the liquid mixture 360 to flow out of the female grinder component 304, into the attached syringe (not shown) via the syringe adapter 362. FIG. 3H is a cross-sectional view of the device of FIG. 3G, showing a liquid mixture flowing out from the female grinder portion and into the syringe adapter. FIG. 3H illustrates the liquid mixture 360 (shown as a blue solid arrow) flowing out from the female grinder component 304 into the syringe adapter 362, in the device shown in FIG. 3G. In embodiments, as shown in FIG. 3H, when valve 342 is opened, at least a portion of the side openings 348 becomes exposed/uncovered by the filter 350, thereby allowing the liquid mixture 360 to flow in from the exposed portion of side openings 348 into the valve 342 and then into the syringe adapter 362 as shown by the blue solid arrow.

Figure 3I:
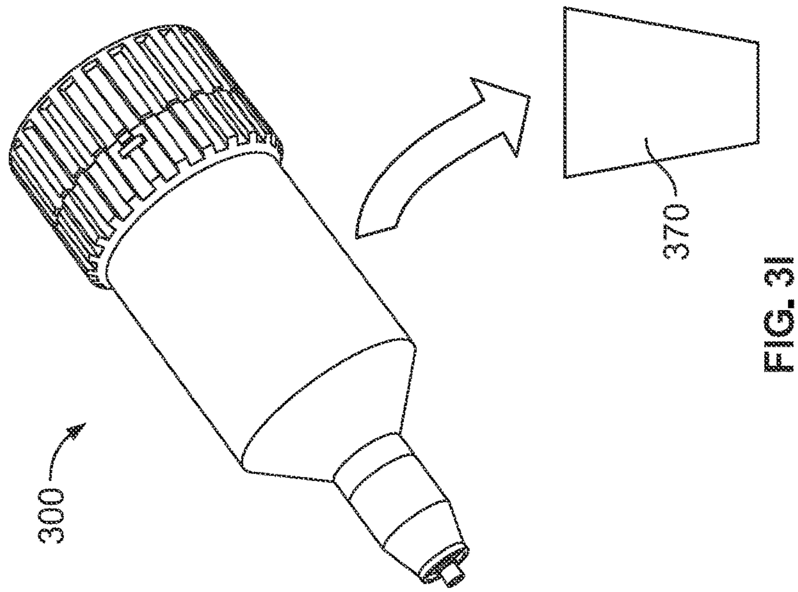
FIG. 3I is an illustration showing an empty device, as described in FIG. 3H, from which the liquid mixture has been suctioned out using a syringe, with the remaining device disposed of as medical waste, in accordance with an embodiment of the present specification.

Liquid mixture 360 flows out of the female grinder component 304 as shown by the blue arrow in FIG. 3H, due to opening of the valve 342, when a syringe (not shown) is attached to the syringe adapter 362 wherein the syringe is used for suctioning out the liquid pill mixture 360. FIG. 3I is an illustration showing an empty device, as described in FIG. 3H, from which the liquid mixture has been suctioned out using a syringe, with the remaining device disposed of as medical waste, in accordance with an embodiment of the present specification. FIG. 3I illustrates the empty device 300 from which the liquid pills mixture 360 has been suctioned out, being disposed-off as medical waste into a medical waste bin 370.

Figure 3K:
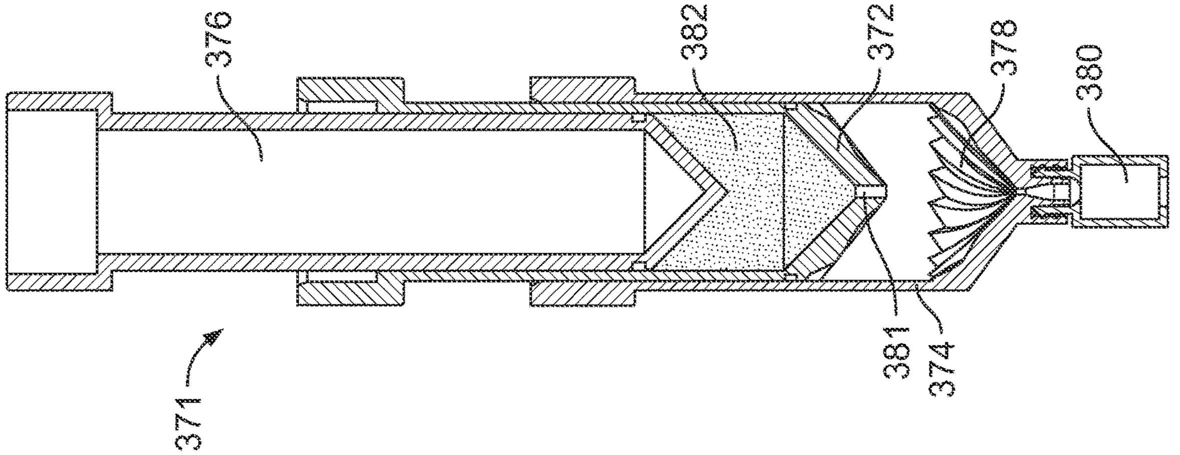
FIG. 3K is a side plan view illustration of the device of FIG. 3J, having liquid in the internal chamber.
Figure 3J:
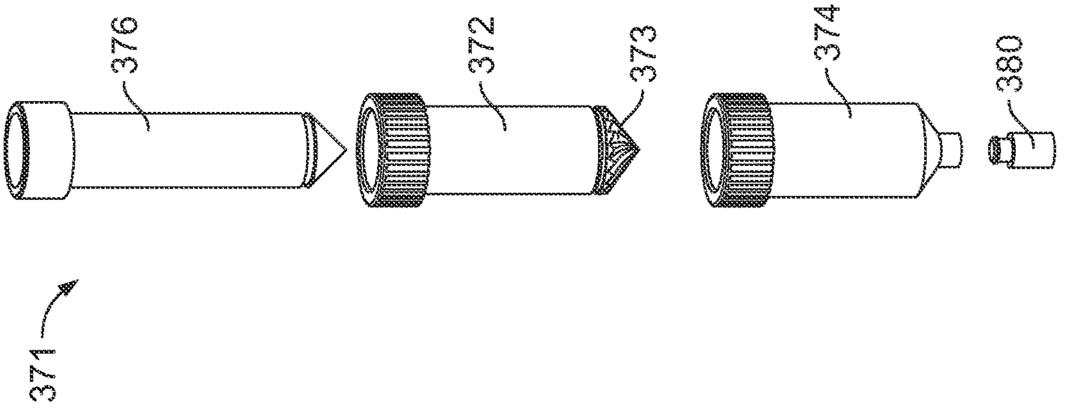
FIG. 3J is a side plan view illustration of a pill crusher device in accordance with another embodiment of the present specification.

FIG. 3J is a side plan view illustration of a pill crusher device in accordance with another embodiment of the present specification. Syringe-shaped device 371 comprises a male grinder component 372 and a female grinder component 374 which are mated and used for crushing pills as explained with reference to FIGS. 2A-2M. A distal end of the male grinder component 372 is provided with serrated edges 373 for aiding in the pulverization of the pills placed within the female grinder component 374. An inner surface of the female grinder component 374 comprises serrated edges 378 (shown in FIG. 3K). The male grinder component 372 is inserted within the female grinder component and is rotated in order to grind the pills. Once the pills placed within the female grinder part 374 are completely crushed, the serrated edges 373 of the male grinder component 372 and the serrated edges 378 provided on the inside surface of the female grinder component 374 are completely mated. Device 371 further comprises a top chamber 376 into which liquid/water is added prior to the addition of the pills.

FIG. 3K is a side plan view illustration of the device of FIG. 3J, containing liquid in the internal chamber. Referring to FIGS. 3J and 3K, the liquid is pumped between top chamber 376, the male grinder component 372 and the female grinder component 374 in order to mix with the ground pills. An opening/hole 381 is provided at a distal end of the male grinder component 372 so that the liquid passes through to the female grinder component 374 and mixes with crushed/ground pills powder. Hence, the device 371 eliminates the need for a syringe to be attached to a distal end of the female grinder component 374 for pushing liquid that is mixed with the ground pills powder, as the liquid is provided within a chamber of the device. Device 371 further comprises a cap 380 coupled to a distal end of the female grinder device, wherein the cap 380 is made of a filter material that allows air to flow into and out of the device during the pill crushing process yet prevents liquid from passing through or leaking out of the device 371. In an embodiment, the filter is a hydrophobic filter. In other embodiments, the filter is a porous polymer filter, however, in other embodiments, a variety of suitable materials (such as, but not limited to polyethylene) may be used to make the filter in the cap 380. In embodiments, the filter is fabricated using a porous polymer, having a porosity ranging from 5 microns to 60 microns. Once the pill powder is thoroughly mixed with the liquid, the cap 380 is removed and the liquid mixture 382 is suctioned out via a syringe (not shown on FIG.) for administration of the liquid mixture to a patient. In an alternative embodiment, the liquid pill mixture may be drawn back into the male grinder component 372 such that male grinder component 372 coupled with the top chamber 376 operate as a syringe, whereby the mixture can then either be injected directly into the patient via opening 381 or extracted via a syringe for delivery to the patient.

Figure 4:
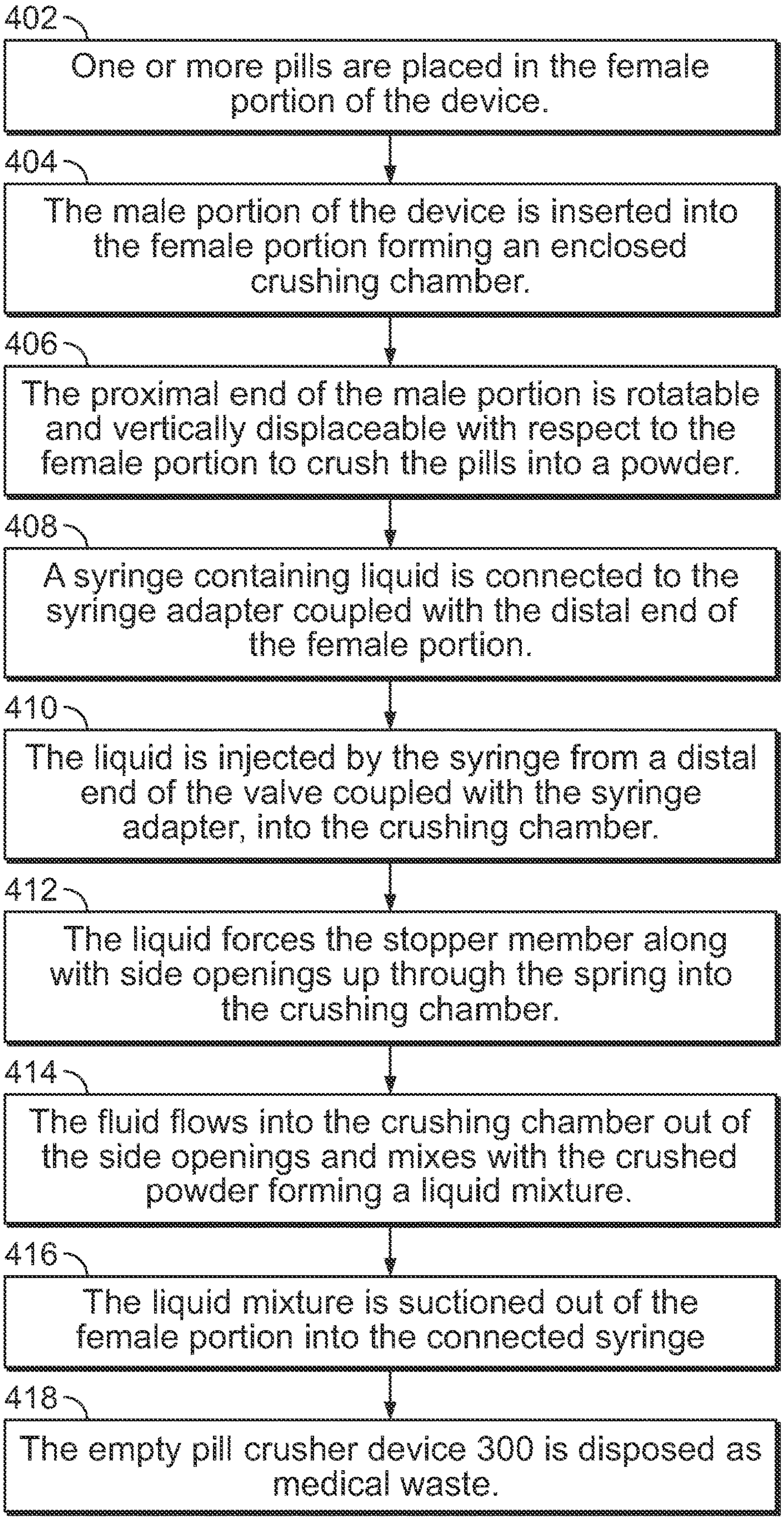
FIG. 4 is a flowchart illustrating exemplary steps of operation of the pill crusher device shown in FIGS. 3A-3I, in accordance with an embodiment of the present specification.

FIG. 4 is a flowchart illustrating exemplary steps of operation of the pill crusher device shown in FIGS. 3A-3I, in accordance with an embodiment of the present specification. Referring to FIGS. 3A-3G and FIG. 4, at step 402, one or more pills are placed in the female grinder component 304, as shown in FIG. 3B. At step 404, the male grinder component 302 is inserted into the female grinder component forming an enclosed crushing chamber 308 within the female grinder component 304, as shown in FIG. 3C. In an embodiment, the male grinder component is inserted within the female grinder component until the proximal grooved end 319 of the of the male grinder component 302 sits over and abuts the proximal grooved end 315 of the female grinder component 304 as shown in FIG. 3A. Upon insertion, the male grinder component 302 automatically attaches to the female grinder component 304 such that it is not removable from the female grinder component 304 without breaking a tab structure positioned on the female grinder component 304.

At step 406, the proximal grooved end 319 of the male grinder component 302 is rotated with respect to the female grinder component 304 for crushing the pills into a powder, as shown in FIG. 3E. In embodiments, one or more of the inner surface of the female grinder component 304 and the distal end of the male grinder component 302 are provided with serrated edges for aiding the pulverization of the pills. In an embodiment, an auditory alert or sound is emitted by the serrated edges while the pills are being crushed. The sound changes in at least one of pitch or frequency as the pill particles become smaller, enabling a user to know when the pills have been crushed completely. In an embodiment, a portion of the wall of the female grinder component 304 is designed to be transparent in order to provide the user with a visual indication that the pills have been crushed completely to a powder form. In embodiments, the powder form does not fill up more than 40% to 90% of the crushing chamber formed within the female grinder component 304. In a preferred embodiment, the pill powder does not fill up more than 50% of the crushing chamber formed within the female grinder component 304. In an embodiment, the device 300 may crush up to 50 pills, and preferably 3 pills at a time.

In embodiments, the pill crusher device 300 eliminates drug loss and increases the yield of intended dose as the entire pill is fully crushed in a closed environment without being exposed to the atmosphere. In an embodiment, the device 300 captures at least 76% of the pills being crushed and in a preferred embodiment, 90% or more of the pills being crushed are mixed with a liquid to create a liquid suspension form deliverable to a patient.

An appropriate pressure level is maintained in the enclosed crushing chamber 308 as air passes into and out through the chamber via the side openings 348 covered by the filter 350 which allows air to pass while preventing any liquid or solid particles from flowing out of the side openings 348.

At step 408, a syringe containing water/liquid is connected to the syringe adapter 362. At step 410 the water/liquid is pushed by the syringe from a distal end of the valve 342 coupled with the syringe adapter, up through the hollow length of the valve 342 into the crushing chamber 308. At step 412 the connection of the syringe to the syringe adapter 362 pushes the stopper member 346 along with the side openings 348 up through the spring 340 into the crushing chamber 308 within the female grinder component 304. At step 414 the water/liquid flows into the crushing chamber out of the side openings 348 and mixes with the crushed pills powder forming a liquid mixture 360.

At step 416 the liquid mixture 360 is suctioned out of the female grinder component 304, into the connected syringe (not shown). In embodiments, the fluid mixture 360 flows out of the female grinder component 304 via the side openings 348 and the syringe adapter 362, due to opening of the valve 342, bypassing the filter 350 via the force of the fluid traveling up the valve 342, as shown in FIG. 3H. In embodiments, steps 410 to 416 may be repeated for enabling the mixture to flow back and forth between the syringe and the crushing chamber as many times as required by the user, for completely mixing the fluid with the medication powder. In various embodiments, any size syringe may be used with the pill crusher device 300 and in embodiments, the same syringe that is required to be administered to a patient may be used with the pill crusher device 300 for mixing the pill powder with fluid.

In an embodiment, once a pill is crushed and mixed with water/fluid pushed by a syringe, the syringe may be removed while the syringe is carrying at least a portion of the liquid pill powder mixture for administering the same to a patient. Next, the same or a different syringe may be attached to the device 300 for pushing in more water/fluid for further mixing with any remaining pills powder mixture in the device 300. In embodiments, the device 300 is washed/flushed multiple times by pushing water/fluid via attaching a syringe to the device, until all residue pills powder mixture is removed from the device 300. At step 418 the empty pill crusher device 300 is disposed of as medical waste, as shown in FIG. 3I.

Figures 5A, 5B, 5C, 5D:
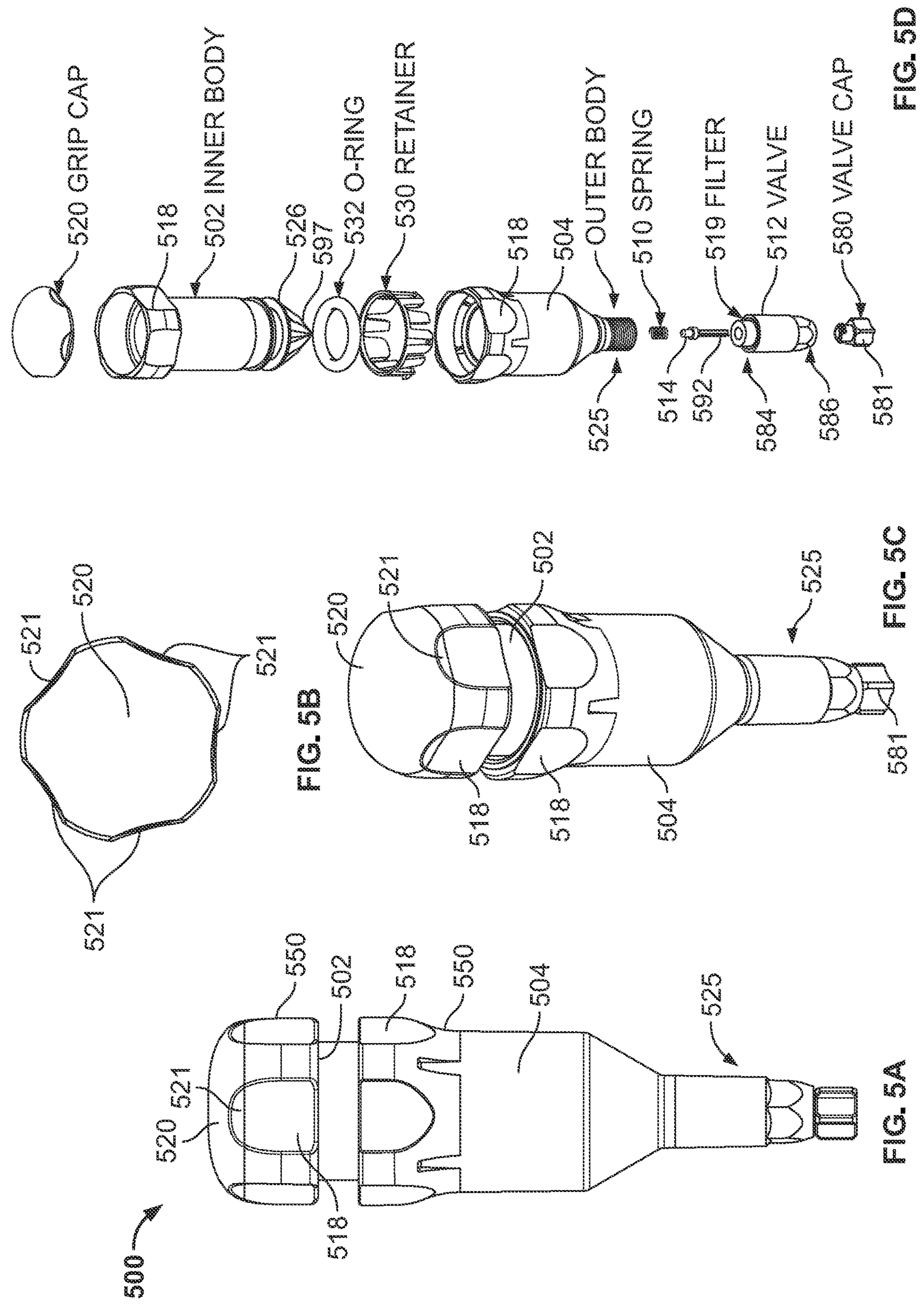
FIG. 5A is a front plan view of a pill crusher device, in accordance with another embodiment of the present specification.
FIG. 5B illustrates a cap of the male grinder component, in accordance with another embodiment of the present specification.
FIG. 5C is a perspective view of the pill crusher device shown in FIG. 5A, in accordance with an embodiment of the present specification.
FIG. 5D is an exploded perspective view of exemplary components of the pill crusher device shown in FIG. 5A, in accordance with an embodiment of the present specification.

FIG. 5A is a perspective view of a pill crusher device, in accordance with another embodiment of the present specification. FIG. 5B illustrates a pentagonal shaped cap of the male grinder component, in accordance with another embodiment of the present specification. FIG. 5C illustrates another view of the pill crusher device shown in FIG. 5A. FIG. 5D is an exploded perspective view of exemplary components of the pill crusher device shown in FIG. 5A, in accordance with an embodiment of the present specification.

The structure and components of pill crusher device 500 is similar to that described with reference to FIGS. 2A-2M above. Referring simultaneously to FIGS. 5A-5E, pill crusher device 500 comprises a male grinder component 502 which, during operation of device 500 is at least partially inserted into a female grinder component 504. In an embodiment, the male grinder component 502 is inserted completely into the female grinder component 504, such that a small length of the male grinder component 502 remains protruding above the female grinder component 504 for preventing a user's fingers from getting hurt/pinched while rotating the male grinder component 502 with respect to the female grinder component 504. Both the proximal end of the male grinder component 502 and the proximal end of the female grinder component 504 each comprise a five-point grip 550 with deep features to aid a user's grip while rotating the male grinder component 502 with respect to the female grinder component 504 for crushing pills placed within the chamber of female grinder component 504. In embodiments, the deep features of the grip 550 are ergonomically designed, wherein an inscribed circle defining a base of the grip 550 is approximately 10% smaller than a circle circumscribing an outer/upper portion of the grip 550. A pentagonal shaped grip cap 520 is fitted on the male grinder component 502, wherein each of the five grooves 521 of the grip cap 520 align with a respective groove 518 of the male grinder component 502. In embodiments, the grip 550 may be designed in other shapes, such as, but not limited to a textured cylindrical grip design. The cap 520, as described, provides accurate hand grip placement as well as ergonomic comfort when the hands are used to provide rotation.

To aid in the grinding of solid medication, the male grinder component 502 is pushed into the female grinder component 504 and rotated until the solid medication is completely crushed by the action between the male grinder component 502 and the female grinder component 504. In embodiments, an inner, concave surface of the distal end 525 of the female grinder component 504 is provided with serrated edges 596 and an outer, convex surface of the distal end 526 of male grinder component 502 is provided with serrated edges 597 for aiding the pulverization of the pills, which occurs when the distal end 526 of the male grinder component 502 is inserted into and rotated with respect to the female grinder component 504 for crushing the pills into a powder. In various embodiments, serrated edges comprise a plurality of teeth having differing number, depth, shape, and orientations, embodiments of which have already been described with reference to FIG. 1D-1J above. In various embodiments, serrated edges of device 500 comprise a plurality of teeth ranging in number from 1 to 100, having various shapes as described with respect to FIGS. 1D-1J, wherein the teeth have a depth ranging from 0.5 mm to 10 mm when measured from tip to base, permitting a clockwise, a counterclockwise or a bidirectional rotation of the male grinder component with respect to the female grinder component. The plurality of teeth aid in reducing an effort required for grinding/crushing pills placed in the female grinder component and make the device easy and convenient to use.

In order to prevent the male grinder component 502 from accidently falling out of the female grinder component 504 during the grinding/crushing process (which would release the medication powder to the atmosphere), the device 500 further comprises a retainer or retaining ring 530 and a sealing member 532 positioned between the male grinder component 502 and the female grinder component 504 configured to both enable the male grinder component 502 to fit into the female grinder component 504 and seal the crushing chamber from the atmosphere, effectively creating an approximate hermetic seal. In embodiments, the sealing member may be an O-ring, an X-ring, a wing tip or any similar structure of any other shape that provides a sealing mechanism for achieving the objectives of the present specification.

In embodiments, a portion of the inner surface of the female grinder component 504 that is located at a distal end 525 of the female grinder component 504 is configured to receive or be coupled with a spring 510 which, in turn, is configured to receive or be coupled with a stopper 514 forming a sealed contact. The distal end 525 of the female grinder component 504, in embodiments, is cylindrical in shape and is sized/designed such that the spring 510 fits snugly therein. Stopper 514 further includes a valve stem 592, which is designed to mate with a valve 512, which is, in an embodiment, is a hollow, elongated member having a proximal end 584 and a distal end 586. In other embodiments, the valve maybe solid or provide a single opening providing a path for liquid to flow out from the female grinder component 504 via a syringe.

A filter 519 is positioned between a distal end of the valve stem 592 and an opening positioned at a proximal end 584 of the valve 512, which is mated with the valve stem 592, and thus, the spring 510, at its proximal end 584. In embodiments, the filter is positioned into valve 512 such that the filter envelopes the side walls of the opening positioned at a proximal end 584 of valve 512. Filter 519 prevents liquid or solid particles from flowing out of the device. In an embodiment, the filter 519 does not need to surround the valve stem 592, and may be provided as a separate connection between the female grinder component 504 and a syringe adapter. In embodiments, the filter 519 may be designed and positioned suitably to provide an alternate path for air to travel through the device 500, while preventing liquid or solid particles from flowing out of the device. In an embodiment, the filter is a hydrophobic filter. In other embodiments, the filter is a porous polymer filter, however, in other embodiments, a variety of suitable materials (such as, but not limited to polyethylene) may be used to make the filter in 519.

In embodiments, a cap 580 is coupled to a distal end 586 of valve 512, wherein the cap 580 allows air to flow into and out of the device 500 during the pill crushing process yet prevents liquid from passing through or leaking out of the device 500. Once the pill powder is thoroughly mixed with the liquid, cap 580 is removed and the liquid and pills mixture is suctioned out via a syringe (not shown in the figures) for administration of the liquid and pills mixture to a patient. In embodiments, the cap 580 prevents inadvertent pressing of the valve stem 592 which extends beyond the valve 512 housing for engaging with the syringe, while crushing the pills. If the valve stem 592 is pressed, liquid that is mixed in the device may leak out as it would cause the stopper 514 to move upward, compromising the sealed contact.

Figure 8A:
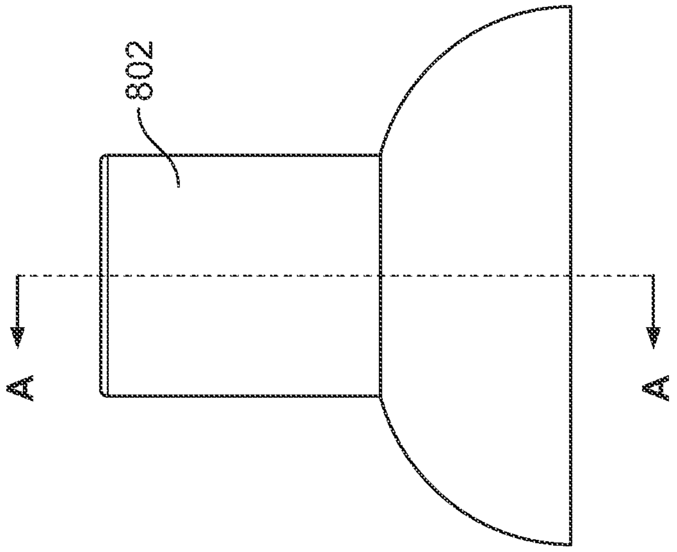
FIG. 8A illustrates a protective cone for preventing inadvertent pressing of a valve of the of the pill crusher device shown in FIG. 5D, in accordance with an embodiment of the present specification.
Figure 8B:
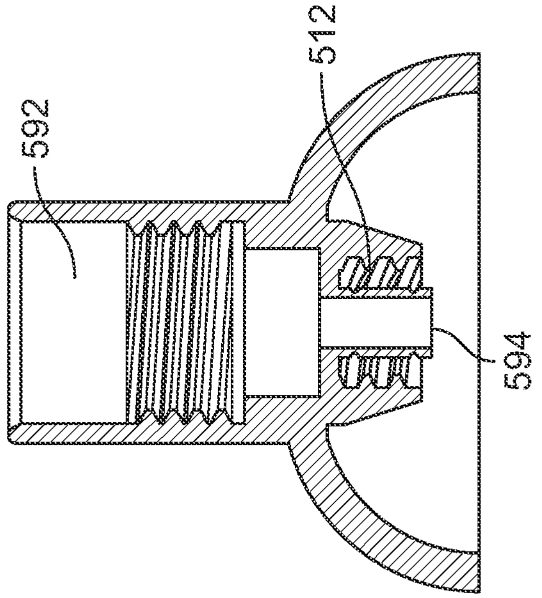
FIG. 8B illustrates a cross sectional view of the protective cone shown in FIG. 8A, in accordance with an embodiment of the present specification.
Figure 8C:
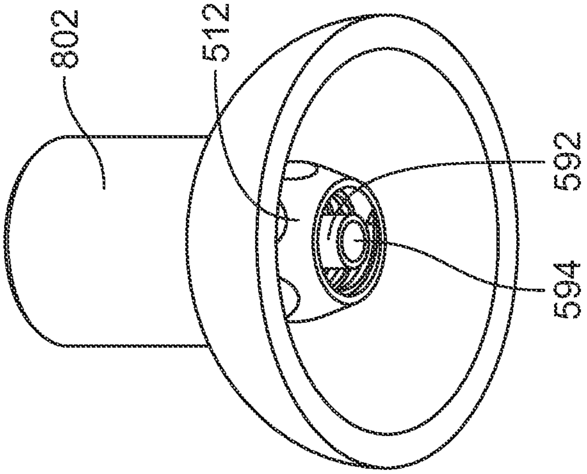
FIG. 8C illustrates a perspective view of the protective cone shown in FIG. 8A, in accordance with an embodiment of the present specification.

In another embodiment, a protective cone is molded into the housing of valve 512, which extends beyond the exposed valve stem 592, necessitating a secondary manual process to actuate the valve. FIG. 8A illustrates a protective cone for preventing inadvertent pressing of a valve of the of the pill crusher device shown in FIG. 5D, in accordance with an embodiment of the present specification. FIG. 8B illustrates a cross sectional view of the protective cone shown in FIG. 8A, in accordance with an embodiment of the present specification. FIG. 8C illustrates a perspective view of the protective cone shown in FIG. 8A, in accordance with an embodiment of the present specification. Referring to FIGS. 5A-5E and FIGS. 8A-8C, in an embodiment, a protective cone 802 is molded into the housing of valve 512 for protecting a distal tip 594 of the valve stem 592 extending beyond the valve housing 512. As can be seen in FIGS. 8B and 8C, the cone 802 extends beyond the tip 594, and thereby said cone 802 protects the valve stem 592 extending beyond the valve housing 512 from being pressed inadvertently.

Figure 5G:
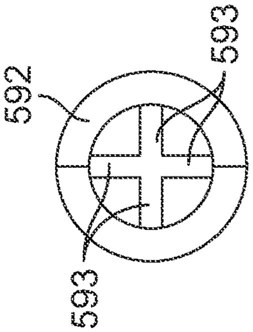
FIG. 5G illustrates a cross sectional view of the valve stem shown in FIG. 5F, in accordance with an embodiment of the present specification.
Figure 5F:
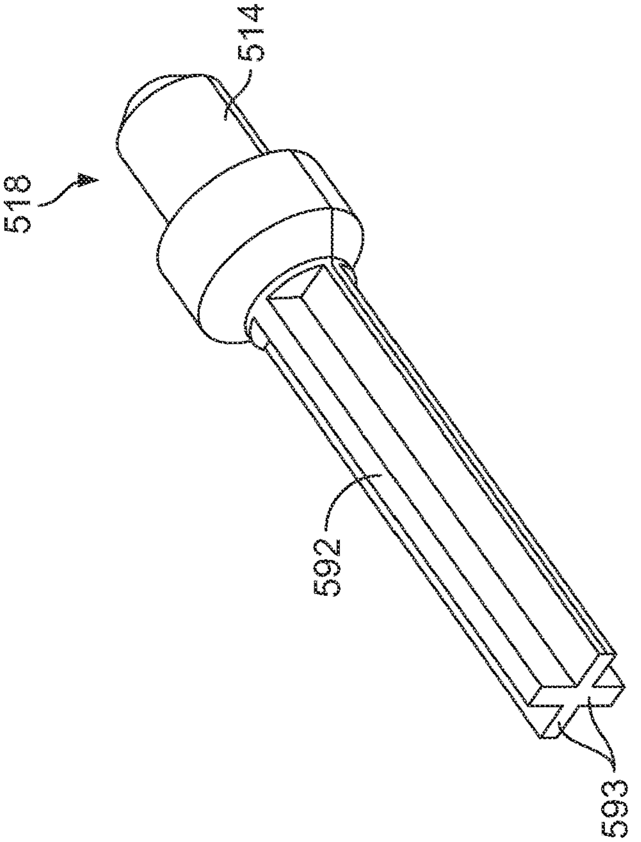
FIG. 5F illustrates another perspective view of a valve of the pill crusher device shown in FIG. 5D, in accordance with an embodiment of the present specification.
Figure 5E:
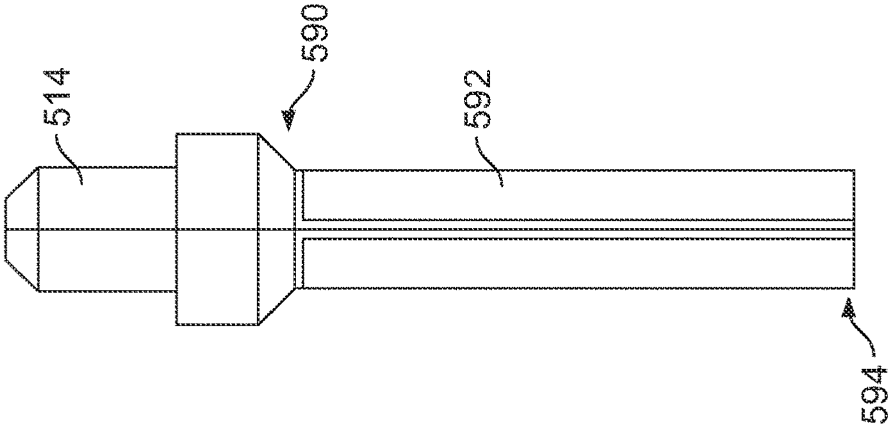
FIG. 5E illustrates a perspective view of a valve of the pill crusher device shown in FIG. 5D, in accordance with an embodiment of the present specification.
Figure 5H:
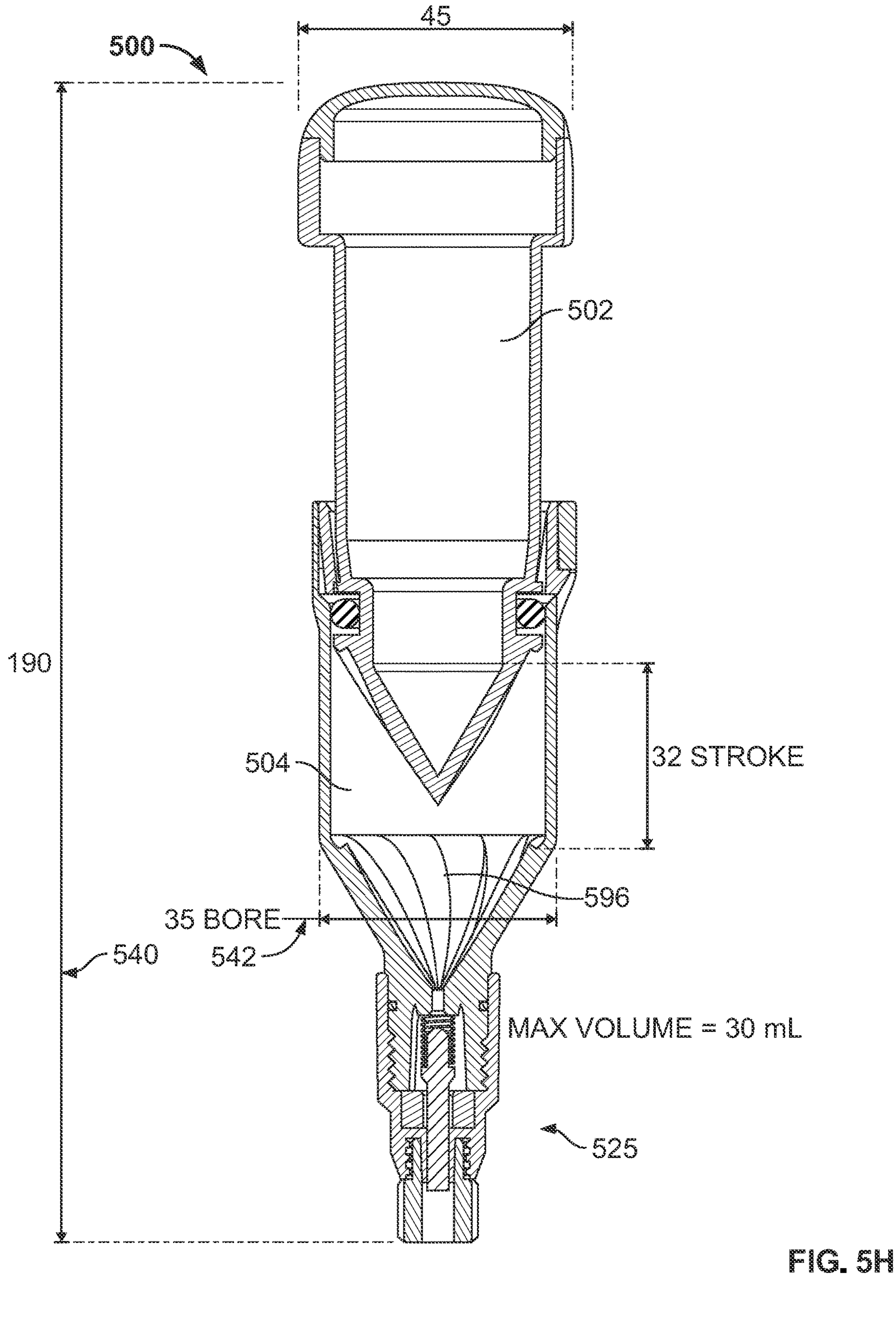
FIG. 5H is a cross-sectional view of device 500 shown in FIGS. 5A, in accordance with an embodiment of the present specification.

In yet another embodiment, FIG. 5E illustrates a perspective view of an extended stopper and valve stem of the pill crusher device shown in FIG. 5D, in accordance with an embodiment of the present specification. FIG. 5F illustrates another perspective view of a stopper and valve stem of the pill crusher device shown in FIG. 5D. Referring simultaneously to FIGS. 5D-5F, stopper member 514 fits into a spring 510 forming a sealed contact and is coupled to a proximal end 590 of the valve stem 592. In an embodiment, as shown in FIGS. 5E, 5F, and 5G valve stem 592, having both a proximal end 590 and a distal end 594, is designed to have an 'X'-shaped cross section. FIG. 5G illustrates a cross sectional view of the valve stem shown in FIG. 5F, in accordance with an embodiment of the present specification. The valve stem 592 includes four flanges 593 running longitudaly along the length of the valve stem 592, such that a cross section of the stem 592 is shaped as an 'X', wherein the 'X' is formed by the flanges 593. The 'X' shaped design of the valve stem 592 prevents clogging of the crushed pill powder when being mixed with water. In embodiments, drug or pill particles passing though the X-shape would then have four opportunities to enter or exit the device reducing clogging compared with a cylindrical, solid stem whereby drug or pill particles would only have one route for entry/exit. In embodiments, the valve stem 592 may be designed in a variety of shapes for preventing/minimizing clogging, such as, but not limited to a T-shape or an I-shape, providing an increased surface area for particles to pass upon entry or exit from the device 500.

FIG. 5H is a cross-sectional view of device 500 shown in FIGS. 5A, in accordance with an embodiment of the present specification. In embodiments, the design and dimensions of the pill crusher device shown in FIG. 5H may be implemented for pediatric use. As shown, in an embodiment, a total length 540 of device 500 is 190 mm, an internal volume is 30 ml and internal diameter 542 is 35 mm. As shown in FIG. 5H, device 500 has a stroke of 32, which represents the maximum distance that the male grinder component and female grinder component may separate from each other, or the slide distance, which then yields the internal volume of the female grinder component, or the device 500. In embodiments, the dimensions provided herein range from anywhere between a decrease by 50% of the stated values to an increase by 100% of the stated values, and any increment therein. In other embodiments, the dimensions provided herein range from anywhere between a decrease by 10% of the stated values to an increase by 10% of the stated values, and any increment therein.

FIG. 6 is a flowchart illustrating exemplary steps of operation of the pill crusher device shown in FIGS. 5A-5H, in accordance with an embodiment of the present specification. Referring to FIGS. 5A-5H and FIG. 6, at step 602, one or more pills are placed in the female grinder component 504. At step 604, the male grinder component 502 is inserted into the female grinder component 504 forming an enclosed crushing chamber within the female grinder component 504. Upon insertion, the male grinder component 502 automatically locks with the female grinder component 504 preventing detachment of parts during operation.

At step 606, the proximal grooved end of the male grinder component 302 is rotated with respect to the female grinder component 304 for crushing the pills into a powder, by using the five-point grip 518 which aids in said rotation. In embodiments, either one or both of the inner surface of the female grinder component 504 and the distal end of the male grinder component 502 are provided with serrated edges for aiding the pulverization of the pills. In embodiments, and as described above, also in step 606, filter 518 prevents crushed particles from escaping the device.

At step 608, a syringe containing water/liquid is connected to a distal end 594 of the valve 512 protected by a valve cap 580. At step 610 the water/liquid is pushed by the syringe from the distal end 594 of the valve 512, up through the gap between the four flanges 593 running longitudinally along the length of the valve stem 592 of the valve 512 into the crushing chamber. At step 612 the connection of the syringe to the valve 512 pushes the stopper member 514 up through the spring 510 into the crushing chamber within the female grinder component 504. At step 614 the water/liquid flows into the crushing chamber aided by the gap between the four flanges 593 running longitudinally along the length of the valve stem 592 and mixes with the crushed pills powder forming a liquid and pills mixture. The flanges 593 provide an 'X' shaped cross-section to the valve 512. The 'X' shaped design of the valve stem 592 prevents clogging of the crushed pills powder when being mixed with water via a syringe connected to the valve cap 580. In embodiments, the valve stem 592 may be designed in a variety of shapes for preventing/minimizing clogging. At step 616 the liquid and pills mixture is suctioned out of the female grinder component 504, into the connected syringe (not shown).

Figure 7C:
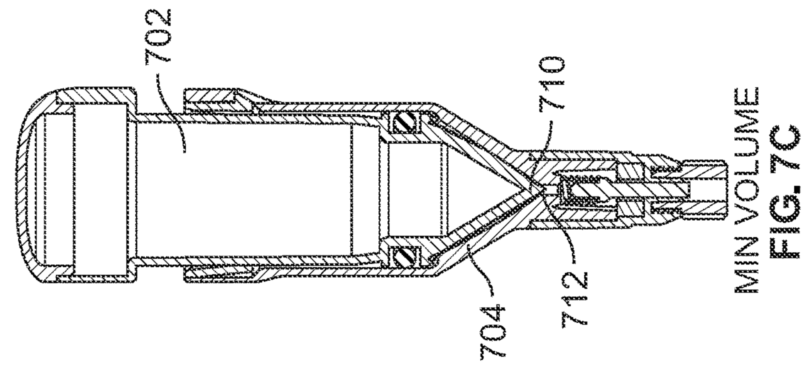
FIG. 7C illustrates the pill crusher device shown in FIG. 5A in an assembled, fully deployed state wherein the female grinder component has a minimum internal volume, in accordance with an embodiment of the present specification.
Figure 7B:
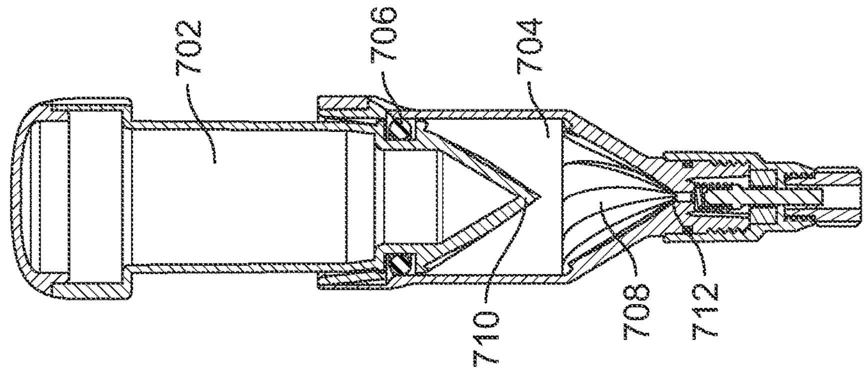
FIG. 7B illustrates the pill crusher device shown in FIG. 5A in a partially deployed state, in accordance with an embodiment of the present specification.
Figure 7A:
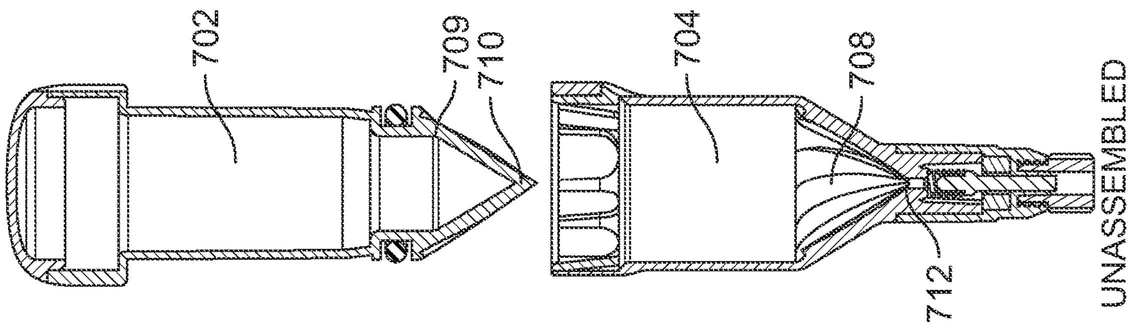
FIG. 7A illustrates the pill crusher device shown in FIG. 5A in an undeployed state, in accordance with an embodiment of the present specification.

FIG. 7A illustrates the pill crusher device shown in FIG. 5A in an undeployed state, in accordance with an embodiment of the present specification. As can be seen a male grinder component 702 is separate from and has not been inserted into a corresponding female grinder component 704. In embodiments, the male grinder component has serrated edges or surfaces 709 provided on the convex surface portion. In embodiments, the female grinder component has serrated edges or surfaces 708 provided on the inner, concave surface portion. FIG. 7B illustrates the pill crusher device shown in FIG. 5A in a partially assembled state, in accordance with an embodiment of the present specification. As can be seen in FIG. 7B, the male grinder component 702 has been at least partially inserted into the female grinder component 704 and locked in place by using a locking mechanism 706 such as a retainer ring, as explained with reference to FIG. 2F above. In the locked state, a maximum volume of the female grinder component 704 is obtained. Pills may be placed within the volume of the female grinder component 704 having serrated edges 708 provided on an inside surface. The pills may be crushed by rotating the male grinder component 702 with respect to the female grinder component 704, till the pills are completely crushed and a distal edge 710 of the male grinder component 702 aligns with a distal edge 712 of the female grinder component 704. FIG. 7C illustrates the pill crusher device shown in FIG. 5A in a fully deployed and used state wherein the female grinder component has a minimum internal volume, in accordance with an embodiment of the present specification.

The above examples are merely illustrative of the many applications of the system of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A device for grinding or crushing one or more pieces of solid medication, the device comprising:

a male grinder component having a proximal end, a distal end, and a first plurality of serrated edges on an outer surface of the male grinder;

a female grinder component defining a chamber for receiving the one or more pieces of solid medication, wherein the distal end of the male grinder component is configured to be at least partially received into the chamber of the female grinder component to form an enclosed chamber, wherein an outer surface of the chamber of the female grinder component comprises a second plurality of serrated edges, and wherein, as the male grinder component is rotated relative to the female grinder component, the first plurality of serrated edges is configured to move relative to the second plurality of serrated edges to thereby grind the one or more pieces of solid medication into a powder;

a spring, wherein a distal end of the female grinder component is configured to receive the spring;

a valve comprising a stopper member and at least one opening, wherein the valve is coupled with the spring;

an adapter coupled with the valve and the distal end of the female grinder component, wherein the adapter is configured to selectively seal the enclosed chamber and to couple to a syringe; and a filter positioned between the distal end of female grinder component and the adapter, wherein the filter is adapted to prevent liquid, medication powder, or a mixture thereof from passing through the device and wherein the filter is further adapted to allow air to pass in and out from the enclosed chamber, wherein, when the adapter is not coupled to the syringe, the stopper member is biased by the spring to maintain the at least one opening outside of the enclosed chamber, thereby sealing the enclosed chamber except for gas flow through the filter, and wherein, when the syringe is coupled to the adapter, the stopper member is displaced relative to the spring to move the at least one opening into the enclosed chamber, thereby permitting liquid to enter from the syringe into the enclosed chamber.

2. The device of claim 1, wherein the adapter is a syringe adapter configured to receive the syringe, and wherein the syringe is configured to inject liquid into the enclosed chamber.

3. The device of claim 2, wherein the stopper member is configured to be pushed inside the spring when the syringe is connected to the syringe adapter.

4. The device of claim 3, wherein, upon the stopper member being pushed relative to the spring, at least one opening is adapted to be positioned in the enclosed chamber and allow the liquid to be mixed with the powder to form a liquid and powder mixture.

5. The device of claim 4, further comprising at least one sealing member coupled with the female grinder component for preventing the liquid and powder mixture from leaking out the enclosed chamber.

6. The device of claim 1, wherein each of the first plurality of serrated edges has a first end and a second end and wherein spacings between the first ends of each of the first plurality of serrated edges is less than spacings between the second ends of each of the first plurality of serrated edges.

7. The device of claim 1 wherein the proximal end of the male grinder component comprises grooves for enabling a hand-grip of the male grinder component and a rotation thereof with respect to the female grinder component.

8. The device of claim 7 wherein a length of the male grinder component ranging from 0.05 inches to 5 inches remains protruding above the female grinder component during crushing of the one or more pieces of solid medication.

9. The device of claim 1, further comprising a retainer ring, wherein the proximal end of the female grinder component comprises a plurality of slots for receiving the retainer ring and wherein the retainer ring comprises a plurality of members adapted to couple to the male grinder component and prevent the male grinder component from disconnecting from the female grinder component during operation.

10. The device of claim 1, wherein the spring is characterized by a spring rate and wherein the spring rate has a value ranging from 0.09 lbs/mm to 0.27 lbs/mm.

11. The device of claim 1, wherein at least a portion of the female grinder component is transparent to enable a user to view the grinding of the solid medication.

12. The device of claim 1, wherein the filter is a hydrophobic filter.

13. The device of claim 1, wherein the valve is a hollow member comprising the at least one opening.

14. The device of claim 13, wherein the filter is positioned to surround the at least one opening to prevent the liquid, the medication powder, or the mixture thereof from passing through said at least one opening.

15. The device of claims 13, wherein the at least one opening has a diameter ranging from 1.25 mm to 5 mm and is configured to allow powder particles in a same size range to pass therethrough.

16. The device of claim 1, wherein the male grinder component and the female grinder component are configured to generate a sound when rotated with respect to one another and wherein the sound changes in pitch as the one or more pieces of solid medication is ground into the powder.

17. The device of claim 1, wherein the male grinder component has a convex shape and the female grinder component has a funnel shape.

18. The device of claim 1, wherein the first plurality of serrated edges and the second plurality of serrated edges each comprise one or more teeth and wherein the number of teeth in each of the first plurality of serrated edges and in the second plurality of serrated edges ranges from 1 to 100.

19. The device of claim 1, wherein the first plurality of serrated edges and the second plurality of serrated edges are configured to match, such that the first plurality of serrated edges and the second plurality of serrated edges intermesh with each other when the male grinder component is inserted into the female grinder component and the one or more pieces of solid medication are crushed when the male grinder component is rotated relative to the female grinder component.

20. The device of claim 1, wherein the first plurality of serrated edges and the second plurality of serrated edges are configured to allow for clockwise or counter-clockwise rotation of the male grinder component relative to the female grinder component to grind the one or more pieces of solid medication into the powder.

* * * * *